US008144362B2

(12) United States Patent
Shibui

(10) Patent No.: US 8,144,362 B2
(45) Date of Patent: Mar. 27, 2012

(54) DETERMINING A PERFECT REPLACEABLE UNIT MOUNTED IN IMAGE FORMING APPARATUS AND IMAGE FORMING SYSTEM

(75) Inventor: Sumio Shibui, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1013 days.

(21) Appl. No.: 11/037,140

(22) Filed: Jan. 19, 2005

(65) Prior Publication Data

US 2005/0254834 A1 Nov. 17, 2005

(30) Foreign Application Priority Data

May 17, 2004 (JP) ................................ 2004-146145

(51) Int. Cl.

| | |
|---|---|
| ***G06F 3/12*** | (2006.01) |
| ***G06K 15/00*** | (2006.01) |
| ***G03G 15/00*** | (2006.01) |
| ***G03G 15/08*** | (2006.01) |
| ***G03G 21/16*** | (2006.01) |

(52) U.S. Cl. ...... 358/1.6; 358/1.13; 358/1.14; 358/1.15; 399/11; 399/12; 399/13; 399/27; 399/111; 399/409

(58) Field of Classification Search .................... 399/24, 399/25, 27, 110, 12, 46; 358/1.6, 1.15, 1.16
See application file for complete search history.

(56) References Cited

U.S. PATENT DOCUMENTS

| | | | | |
|---|---|---|---|---|
| 5,579,088 | A | 11/1996 | Ko | |
| 6,019,461 | A * | 2/2000 | Yoshimura et al. | 347/86 |
| 6,212,338 | B1 | 4/2001 | Hagihara et al. | 399/12 |
| 6,625,402 | B2 * | 9/2003 | Takemoto | 399/8 |
| 6,658,219 | B1 * | 12/2003 | Ito et al. | 399/27 |
| 2001/0046295 | A1 * | 11/2001 | Sako et al. | 380/201 |
| 2002/0085847 | A1 | 7/2002 | Yoshida et al. | |
| 2002/0131763 | A1 * | 9/2002 | David | 386/69 |
| 2002/0131784 | A1 * | 9/2002 | Takemoto | 399/12 |
| 2003/0031475 | A1 * | 2/2003 | Asakura | 399/12 |
| 2004/0078289 | A1 * | 4/2004 | Barid | 705/26 |
| 2004/0247329 | A1 * | 12/2004 | Ito et al. | 399/12 |

(Continued)

FOREIGN PATENT DOCUMENTS

JP A 6-149051 5/1994

(Continued)

OTHER PUBLICATIONS

Notification of Reasons for Refusal for Japanese Patent Application No. 2004-146145 dated Dec. 1, 2009.

(Continued)

*Primary Examiner* — Benny Tieu
*Assistant Examiner* — Haris Sabah
(74) *Attorney, Agent, or Firm* — Oliff & Berridge, PLC

(57) ABSTRACT

When a replaceable unit is mounted, a CPU of an image forming apparatus recognizes whether or not a corresponding machine type code and a corresponding country code are stored in a main body NVM. When the corresponding machine type code and the corresponding country code are not stored in the main body NVM, the CPU reads a machine type code and a country code stored in the unit NVM of the mounted replaceable unit from the unit NVM. The CPU stores the machine type code and the country code read from the unit NVM in the corresponding machine type code and the corresponding country code of the main body NVM.

5 Claims, 31 Drawing Sheets

U.S. PATENT DOCUMENTS

2005/0078165 A1* 4/2005 Harada et al. ................ 347/137

FOREIGN PATENT DOCUMENTS

| | | |
|---|---|---|
| JP | A-07-205528 | 8/1995 |
| JP | B2 2602341 | 1/1997 |
| JP | A 10-133528 | 5/1998 |
| JP | A 2001-100598 | 4/2001 |
| JP | A-2001-242766 | 9/2001 |
| JP | A-2001-296786 | 10/2001 |
| JP | 2002-108147 | 4/2002 |
| JP | B2 3476704 | 9/2003 |
| KR | 2001-0049000 | 6/2001 |

OTHER PUBLICATIONS

Office Action issued in JP Application No. 2004-146145 on Jun. 16, 2010 (with English translation).

Nov. 17, 2011 Japanese Office Action issued in Japanese Patent Application No. 2004-146145 (with translation).

* cited by examiner (FIG. 17 CONTINUED)
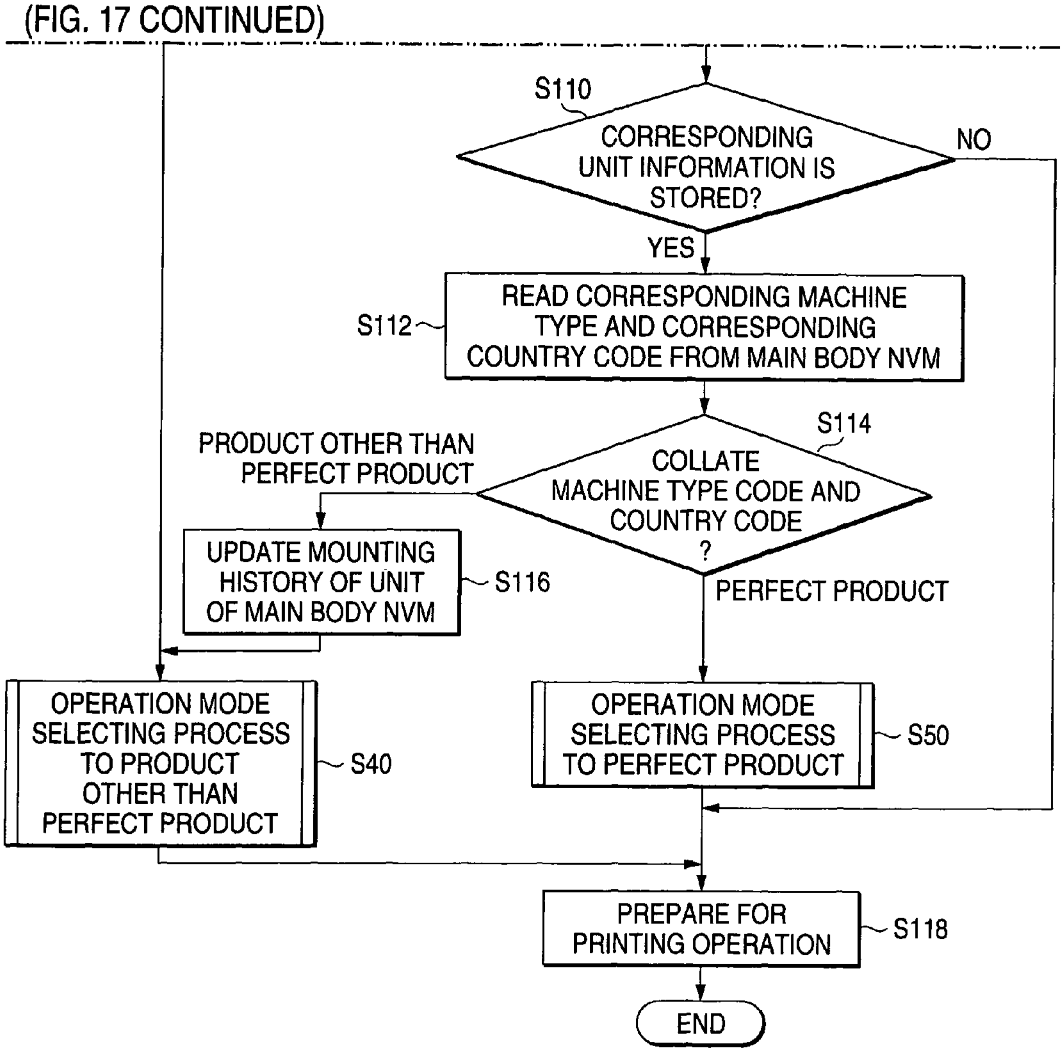

FIG. 22A

| | |
|---|---|
| LANGUAGE CODE | JP |
| AREA CODE | JP |
| CORRESPONDING COUNTRY CODE | 01 |
| CORRESPONDING MACHINE TYPE CODE | 10 |
| CORRESPONDING PRODUCTION NUMBER | A12345 |
| MAKER ID | 01 |

FIG. 22B

| | |
|---|---|
| COUNTRY CODE | 01 |
| MACHINE TYPE CODE | 10 |

FIG. 22C

| | |
|---|---|
| COUNTRY CODE | 01 |
| MACHINE TYPE CODE | 20 |

FIG. 22D

| | |
|---|---|
| COUNTRY CODE | 01 |
| MACHINE TYPE CODE | 10 |
| MAKER ID | 02 |

FIG. 22E

| | |
|---|---|
| COUNTRY CODE | 01 |
| MACHINE TYPE CODE | 10 |
| PRODUCTION NUMBER | B23456 |

DETERMINING A PERFECT REPLACEABLE UNIT MOUNTED IN IMAGE FORMING APPARATUS AND IMAGE FORMING SYSTEM

BACKGROUND OF THE INVENTION

1. Field of the Invention

The present invention relates to an image forming apparatus and an image forming system, and more particularly to an image forming apparatus in which a replaceable unit is mounted on an apparatus main body so as to be replaceable.

2. Background Art

An image forming apparatus In which a unit including consumable goods can be easily replaced by another unit by a user has been known.

When the unit replaced by the user is a product other than a perfect product for the image forming apparatus, the performance of the image forming apparatus cannot be sufficiently exhibited, for instance, the quality of an image is deteriorated, an operation cannot be assured, or an inconvenience such as a failure may arise. These disadvantages arise, because the image forming apparatus controls an image forming process by considering the characteristics of toner, the characteristics of an image carrier, charge voltage, cleaning characteristics and fixing characteristics or the like.

Thus, in order to maintain the quality of the image of the image forming apparatus and prevent inconveniences, JP-A-10-133528 discloses a method in which a data carrier for holding the consumption quantity data of consumable goods is provided in perfect replaceable parts, and a quantity of consumption detected by a consumption quantity detecting part provided in an apparatus main body is compared with the consumption quantity data held by the data carrier to discriminate whether or not the consumable goods is supplied to the perfect replaceable parts.

Further, JP-A-6-149051 discloses that a storing unit for storing preset code data is provided in a toner cartridge and when a copying machine main body side cannot read the preset code data from the storing unit, a copying operation is prohibited.

Further, JP-A-2001-100598 discloses a method in which if empty information written in a cartridge is read from a cartridge to which the toner is supplied when the exhaustion of the toner is detected, an alarm is displayed and a printing operation is prohibited.

Further, Japanese Patent No. 2602341 discloses a method in which the count of formed images is stored in a memory of a cartridge and when a preset completion count showing the number of images that can be formed in the cartridge is equal to the count of the formed images, the cartridge is unable to be used after that.

Further, Japanese Patent No. 3476704 discloses a method in which when it is decided that a mounted toner supplying vessel is not appropriate by a bi-directional communication between a vessel side communication unit of the toner supplying vessel and a main body side communication unit of an apparatus main body and a selecting and inputting unit selects to continuously perform a supplying process by neglecting that the toner supplying vessel is inappropriate, an image forming condition having a level lower than that of a proper image forming condition is set to easily detect that the toner supplying vessel is inappropriate.

SUMMARY OF THE INVENTION

It is a first object of the present invention to provide an image forming apparatus and an image forming system that can use a replaceable unit other than a perfect product in accordance with the intention of a user even when the replaceable unit other than the perfect product is mounted. Further, it is a second object of the present invention to provide an image forming apparatus and an image forming system that can use a mounted replaceable unit even when specific information related to the mounted replaceable unit is not previously registered.

In order to achieve the above-described objects, a first aspect of the present invention resides in an image forming apparatus comprising: an apparatus main body; at least one replaceable unit mounted on the apparatus main body so as to be replaced by another unit; a first information storing unit provided in this replaceable unit and having specific information written; a second information storing unit provided in the apparatus main body in which specific information can be written; a writing unit for writing the specific information from the first information storing unit to the second information storing unit; a comparing unit for comparing the specific information stored in the second information storing unit with information obtained from the replaced replaceable unit and a deciding unit for deciding whether the replaceable unit is a perfect product or a product other than the perfect product in accordance with the compared result of the comparing unit. Specifically, even when the specific information related to the replaceable unit is not previously registered in the apparatus main body, the specific information related to the mounted replaceable unit can be stored. Since whether the replaceable unit is the perfect product or the product other than the perfect product can be decided in accordance with the specific information, the replaceable unit as a product other than the perfect product can be used in accordance with the intention of a user.

Preferably, the specific information written in the first storing unit includes any one or more of a machine type code, a country code, a maker ID or a production number. Accordingly, information related to a specific destination can be obtained from the mounted replaceable unit. Thus, the information related to the specific destination does not need to be previously registered in the apparatus main body.

A second aspect of the present invention resides in an image forming apparatus comprising: an apparatus main body; at least one replaceable unit mounted on the apparatus main body so as to be replaced by another unit; a first information storing unit provided in this replaceable unit and having specific information written; a second information storing unit provided in the apparatus main body in which specific information can be written; a comparing unit for comparing the specific information written in the second information storing unit from a host device with the information obtained from the replaced replaceable unit and a deciding unit for deciding whether the replaceable unit is a perfect product or a product other than the perfect product in accordance with the compared result of the comparing unit. Specifically, even when the specific information related to the replaceable unit is not previously registered in the apparatus main body, the specific information can be stored in the apparatus main body by using the specific information registered in the host device.

Preferably, the comparing unit compares the specific information transmitted from the host device by a printer driver and written in the second information storing unit with the information obtained from the replaced replaceable unit. Accordingly, the specific information can be stored in the apparatus main body by using the specific information registered in the host device-in which the printer driver is installed.

Further preferably, the comparing unit compares the specific information transmitted from the host device by a web browser and written in the second information storing unit with the information obtained from the replaced replaceable unit. Accordingly, the specific information can be stored in the apparatus main body by using the specific information registered in the host device in which the web browser is installed.

Further preferably, the comparing unit compares the specific information transmitted from the host device upon request for printing and written in the second information storing unit with the information obtained from the replaced replaceable unit. Accordingly, the specific information can be stored in the apparatus main body by using the specific information registered in the host device that makes a request for a printing operation.

A third aspect of the present invention resides in an image forming apparatus comprising: an apparatus main body; at least one replaceable unit mounted on the apparatus main body so as to be replaced by another unit; a detecting unit for detecting that the replaceable unit is replaced by another unit; a first information storing unit provided in this replaceable unit and having specific information written; a second information storing unit provided in the apparatus main body in which specific information can be written; a writing unit for writing the specific information from the first information storing unit to the second information storing unit when the detecting unit detects that the replaceable unit is replaced by another unit; a comparing unit for comparing the specific information stored in the second information storing unit with information obtained from the replaced replaceable unit and a deciding unit for deciding whether the replaceable unit is a perfect product or a product other than the perfect product in accordance with the compared result of the comparing unit. That is, even if the specific information related to the replaceable unit is not previously registered in the apparatus main body, when the replaceable unit is replaced by another unit, the specific information related to the replaceable unit can be stored. Since whether the replaceable unit is the perfect product or the product other than the perfect product can be decided in accordance with the specific information, the replaceable unit that is a product other than the perfect product can be employed depending on the intention of a user.

A fourth aspect of the present invention resides in an image forming system comprising: an image forming apparatus including: an apparatus main body, at least one replaceable unit mounted on the apparatus main body so as to be replaced by another unit, a first information storing unit provided in this replaceable unit and having specific information written, a second information storing unit provided in the apparatus main body in which specific information can be written, a comparing unit for comparing the specific information written in the second information storing unit within formation obtained from the replaced replaceable unit and a deciding unit for deciding whether the replaceable unit is a perfect product or a product other than the perfect product in accordance with the compared result of the comparing unit; and a host device connected to the image forming apparatus. The host device contains a printer driver for performing a communication with the image forming apparatus to write the specific information in the second information storing unit of the image forming apparatus by using stored information. Specifically, even when the specific information related to the replaceable unit is not previously registered in the apparatus main body, the specific information can be stored in the apparatus main body by using the specific information registered in the host device. Whether the replaceable unit is the perfect product or the product other than the perfect product can be decided in accordance with the specific information. Thus, the replaceable unit that is a product other than the perfect product can be used depending on the intention of the user.

According to the present invention, even when the replaceable unit that is a product other than the perfect product is mounted, the replaceable unit that is a product other then the perfect product can be used depending on the intention of the user. Further, according to the present invention, even when the specific information related to the mounted replaceable unit is not previously registered, the mounted replaceable unit can be employed.

BRIEF DESCRIPTION OF THE DRAWINGS

These and other objects and advantages of this invention will become more fully apparent from the following detailed description taken with the accompanying drawings in which:

FIG. 16A is a graph showing corrected toner density and FIG. 16B is a graph showing corrected image density;

FIGS. 22A to 22E are diagrams showing contents stored in the main body NVM or the unit NVM;

FIG. 23A shows a screen for receiving an input for selecting the operation mode to the perfect product by the user. FIG. 23B shows a screen for receiving an input for selecting the operation mode to the product other than the perfect product by the user;

DETAILED DESCRIPTION OF THE PREFERRED EMBODIMENTS

Figure 1:
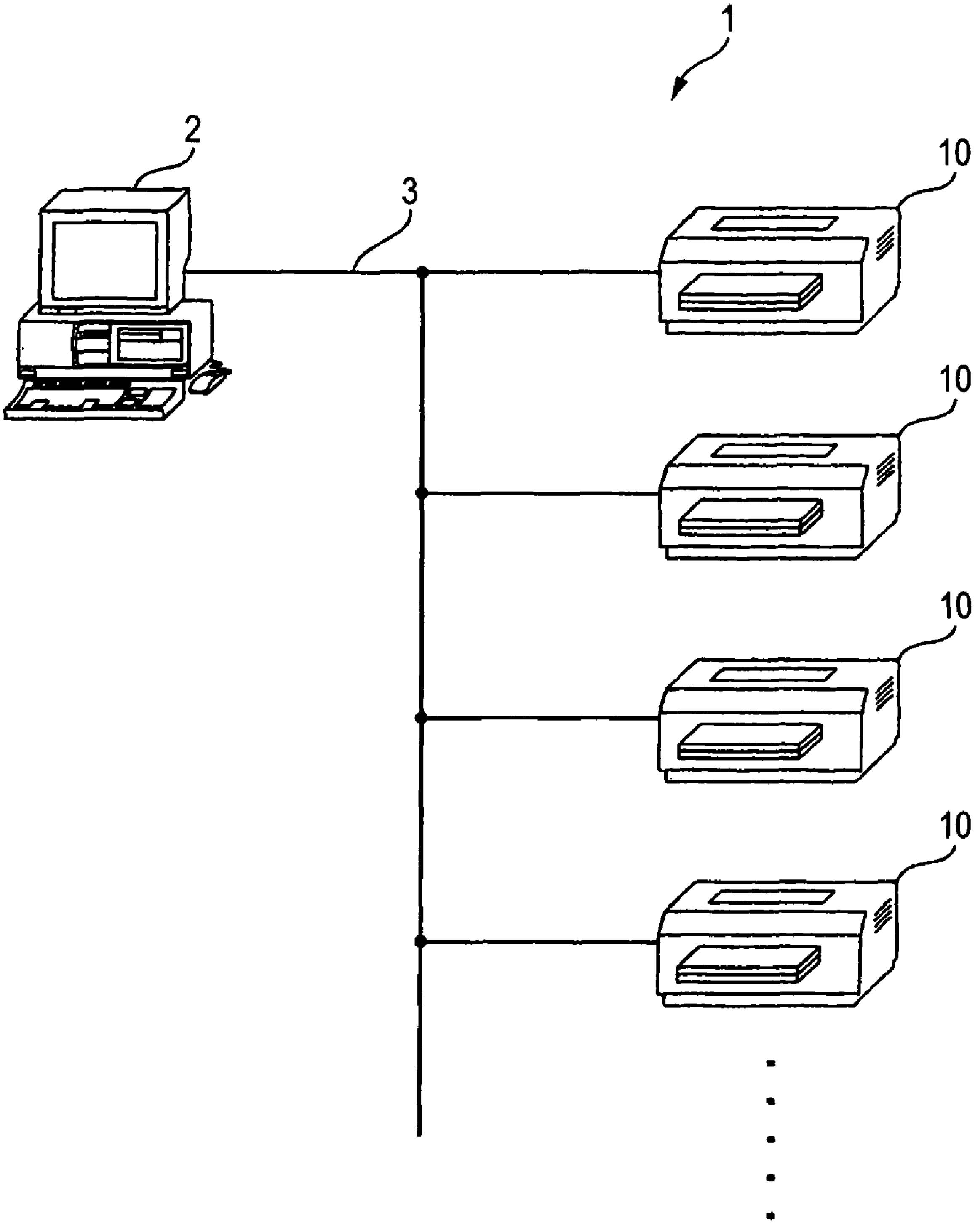
FIG. 1 is a schematic diagram of an image forming system according to an embodiment of the present invention.

Now, embodiments of the present invention will be described by referring to the drawings.

In FIG. 1, an image forming system 1 according to an embodiment of the present invention is shown. The image forming system 1 is formed by connecting a host device 2 such as a PC (Personal Computer) to, for instance, a plurality of image forming apparatuses 10 through a network 3. The host device 2 may be, for instance, a controller such as an MCU (Micro Controller Unit), an input and output device such as a touch panel and a terminal other than the PC having a telecommunication device for transmitting and receiving signals through the network 3. The network 3 may be wired or wireless. Further, a plurality of host devices 2 may be connected to the network 3.

As described above, in the image forming system 1, the host device 2 can control the image forming apparatuses 10 through the network 3.

Figure 2:
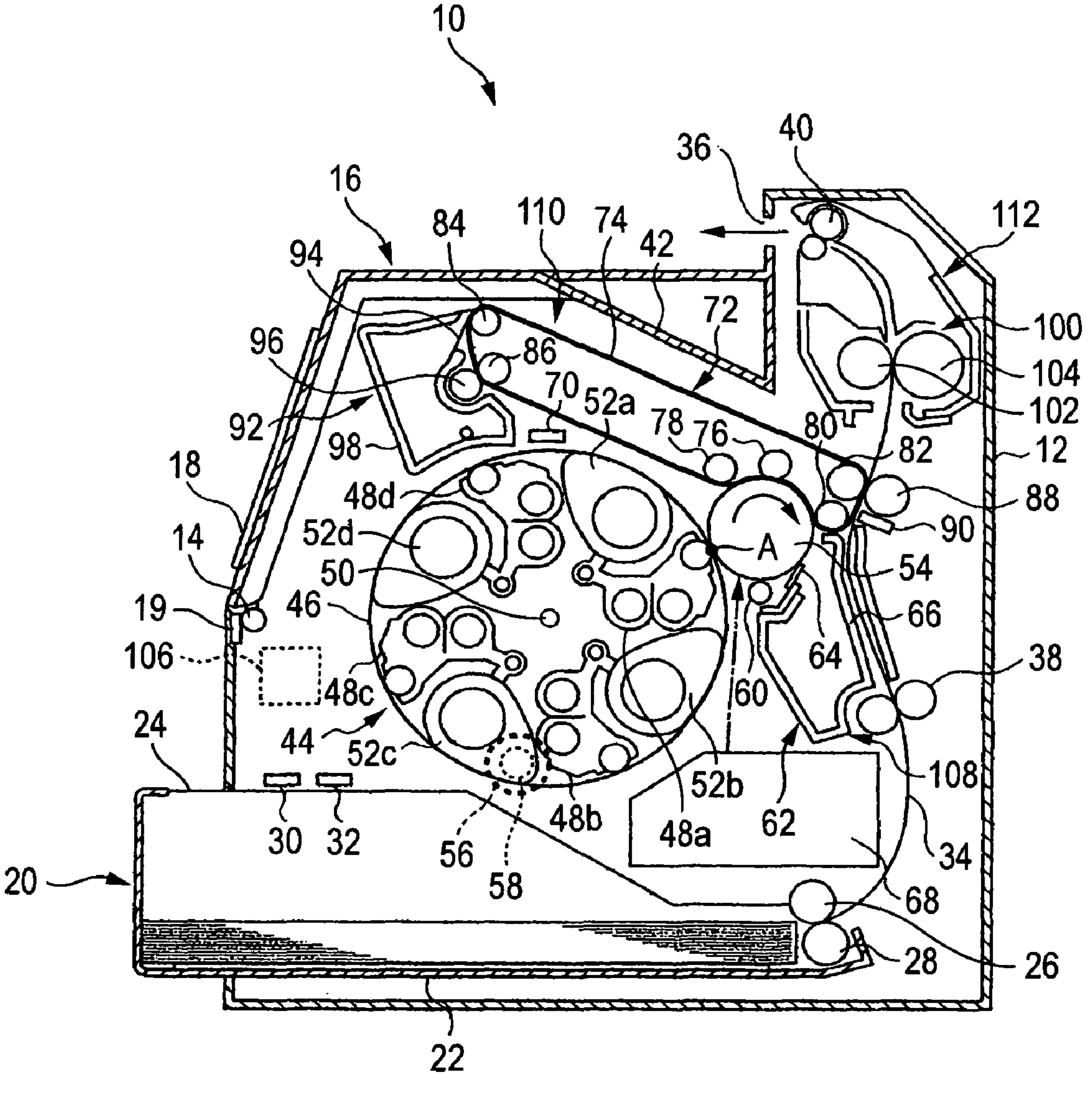
FIG. 2 is a side view showing an outline of an image forming apparatus according to an embodiment of the present invention.

FIG. 2 shows an outline of the image forming apparatus 10. The image forming apparatus 10 includes an image forming apparatus main body 12. On the upper part of the image forming apparatus main body 12, an opening and closing cover 16 that freely rotates on a supporting point 14 for rotation is provided. In the front surface side (a left side in FIG. 2) of the opening and closing cover 16, a user interface (a UI device) 18 such as a touch panel is provided. The UI device 18 displays the control information or the instruction information of the image forming apparatus 10 and receives the input by a user such as instruction information. That is, the user can operate the image forming apparatus 10 through the UI device 18. The UI device 18 may receive only an input of a switch or the like or perform only an output such as a display, or a combination of them.

In the vicinity of the supporting point 14 for rotation, an opening and closing detecting sensor 19 is provided for detecting the opening and closing operations of the opening and closing cover 16 by, for instance, engaging and disengaging in accordance with the opening and closing operations of the opening and closing cover 16.

In the lower part of the image forming apparatus main body 12, a sheet feed unit 20 of, for instance, one step is arranged. The sheet feed unit 20 includes a sheet feed unit main body 22 and a sheet feed cassette 24 in which sheets are accommodated. In an upper part near the interior end of the sheet feed cassette 24, a feed roll 26 for feeding the sheets from the sheet feed cassette 24 and a retard roll 28 for loosening the fed sheets one by one are disposed. In the upper part of the sheet feed cassette 24, a temperature sensor 30 for detecting temperature in the image forming apparatus main body 12 and a humidity sensor 32 for detecting humidity in the image forming apparatus main body 12 are provided.

A conveying passage 34 is a sheet passage from the feed roll 26 to a delivery port 36. The conveying passage 34 is located near the back side (a right side surface in FIG. 2) of the image forming apparatus main body 12 and formed substantially vertically from the sheet feed unit 20 to a below-described fixing device 100. In the upstream side of the fixing device 100 of the conveying passage 34, a below-described secondary transfer roll 88 and a secondary transfer backup roll 82 are arranged. In the upstream side of the secondary transfer roll 88 and the secondary transfer backup roll 82, a resist roll 38 is arranged. Near the delivery port 36 of the conveying passage 34, a delivery roll 40 is arranged.

Accordingly, the sheets fed out by the feed roll 26 from the sheet feed cassette 24 of the sheet feed unit 20 are loosened by the retard roll 28. Only an uppermost sheet is guided to the conveying passage 34 and temporarily stopped by the resist roll 38 to pass between the below-described secondary transfer roll 88 and the secondary transfer backup roll 82 at a prescribed timing and transfer a toner image. The transferred toner image is fixed by the fixing device 100 and delivered to a delivery part 42 provided in the upper part of the opening and closing cover 16 from the delivery port 36 by the delivery roll 40. The delivery part 42 is inclined so as to be low in the delivery port and gradually high toward the direction of a front surface (in the direction of left in FIG. 2).

In the image forming apparatus main body 12, a developing device unit 44 such as a rotary developing device is arranged at, for instance, a substantially central part. The developing device unit 44 has a developing device unit main body 46. On the developing device unit main body 46, four developing devices 48*a* to 48*d* for forming a toner image are mounted. These developing devices 48*a* to 48*d* rotate leftward (counterclockwise in FIG. 2) on a rotating shaft 50 together with the developing device unit main body 46. In the developing devices 48*a* to 48*d*, tubular toner cartridges 52*a* to 52*d* for accommodating toner of Yellow (Y), Magenta (M), Cyan (C) and Black (B) are respectively mounted. When the toner cartridges 52*a* to 52*d* are mounted on the developing device unit main body 46 through the developing devices 48*a* to 48*d*, the outer surfaces of them substantially correspond to the outer periphery of the developing device unit main body 46.

In the developing device unit 44, an image carrier 54 made of, for instance, a photosensitive member is arranged so as to abut from the back surface side (a right side in FIG. 2) of the image forming apparatus 10. That is, in the developing device unit 44, four colors of Y, M, C and K are prepared for a full-color development. The developing devices 48*a* to 48*d* are respectively rotated, moved and positioned at a position opposed to the image carrier 54 to sequentially develop a latent image on the image carrier 54 with one color apiece by the toner of Yellow (Y), Magenta (M), Cyan (C) and Black (K).

In the vicinity of a position substantially opposed to the image carrier 54 with the rotating shaft 50 of the developing device unit 44 put between them, a radio telecommunication part 56 is arranged. The radio telecommunication part 56 has an antenna 58 to perform a radio telecommunication with a below-described memory chip 170.

In the lower part of the image carrier 54, a charging device 60 composed of, for instance, a charging roll for uniformly charging the image carrier 54 is provided. Further, a cleaner 62 for the image carrier abuts on the upstream side of the charging device 60 in the rotating direction of the image carrier 54. The cleaner 62 for the image carrier image includes a cleaning blade 64 for scraping out toner remaining on the image carrier 54, for instance, after a primary transfer and a waste toner recovery bottle 66 for recovering the toner scraped out by the cleaning blade 64.

The back surface side (a right side in FIG. 2) of the waste toner recovery bottle 66 has, for instance, a rib formed and is curved so that the sheets can be smoothly conveyed to form a part of the conveying passage 34.

In the lower part of the back surface side of the developing device unit 44, an exposure device 68 is disposed for writing a latent image by light such as a laser beam on the image carrier 54 charged by the charging device 60. Further, in the upper part of the developing device unit 44, an unused state detecting sensor 70 such as a reflection type photo-sensor is arranged for detecting whether the toner cartridges 52*a* to 52*d* mounted on the developing device unit 44 are unused or not. In the upper part of the developing device unit 44 and the unused state detecting sensor 70, an intermediate transfer device 72 is provided in which the toner image visualized by the developing device unit 44 is primarily transferred one color by one color at a primary transfer position for each rotation of an intermediate transfer member 74, so that the toner images of the four colors are overlapped on the intermediate transfer member 74, and then, the overlapped toner images are simultaneously transferred to the sheets at a below-described secondary transfer position.

The intermediate transfer device 72 includes the intermediate transfer member 74 such as an intermediate transfer belt, a primary transfer roll 76, a wrap in roll 78, a wrap out roll 80, the secondary transfer backup roll 82, a scraper backup roll 84 and a brush backup roll 86. The intermediate transfer member 74 has, for instance, elasticity and is extended substantially flat so as to have long sides and short sides in the upper part of the developing device unit 44. The long side in the upper surface side of the intermediate transfer member 74 is extended so as to be substantially parallel to the delivery part 42 provided in the upper part of the image forming apparatus main body 12. Further, the intermediate transfer member 74 has a primary transfer part (an image carrier wrap area) that abuts on the image carrier 54 in a wrapping state between the wrap in roll 78 disposed in the upstream part of the primary transfer roll 76 and the wrap out roll 80 disposed in the downstream part of the primary transfer roll 76 on the long side of a lower surface side. The primary transfer part is wrapped on the image carrier 54 by a prescribed range and follows the rotation of the image carrier 54.

Further, in the back side (the right side surface in FIG. 2), a flat surface part (a short side) is formed by the wrap out roll 80 and the secondary backup roll 82. This flat surface part forms a secondary transfer part and faces the conveying passage 34.

As described above, to the intermediate transfer member 74, the toner images on the image carrier 54 are overlapped and primarily transferred in order of, for instance, yellow, magenta, cyan and black by the primary transfer roll 76 and the primarily transferred toner images are conveyed to the secondary transfer part.

The scraper backup roll 84 assists a below-described scraper 94 to scrape out the toner remaining on the intermediate transfer member 74 after a secondary transfer. The brush backup roll 86 assists a below-described brush roll 96 to scrape out the toner remaining on the intermediate transfer member 74 after the secondary transfer.

The secondary transfer roll 88 is opposed to the secondary transfer backup roll 82 of the intermediate transfer device 72 with the conveying passage 34 located between them. That is, a part between the secondary transfer roll 88 and the secondary transfer backup roll 82 serves as the secondary transfer position in the secondary transfer part. The secondary transfer roll 88 secondarily transfers the toner image primarily transferred to the intermediate transfer member 74 to the sheets at the secondary transfer position under the assist of the secondary transfer backup roll 82. Here, the secondary transfer roll 88 is separated from the intermediate transfer member 74 while the intermediate transfer member 74 rotates three times, that is, while the toner images of the three colors of yellow, magenta and cyan are conveyed. When a black toner image is transferred, the secondary transfer roll 88 abuts on the intermediate transfer member 74. A prescribed potential difference is generated in the part between the secondary transfer roll 88 and the secondary transfer backup roll 82. For instance, when the secondary transfer roll 88 has high voltage, the second transfer backup roll 82 is connected to a ground (GND) or the like.

In the upstream side of the secondary transfer position, for instance, an image density sensor 90 such as a reflection type photo-sensor is disposed so as to be opposed to the intermediate transfer member 74 with the conveying passage 34 located between them. The image density sensor 90 reads the patch of the toner of the intermediate transfer member 74 to detect the density of the image formed on the intermediate transfer member 74.

A cleaner 92 for the intermediate transfer member is provided so as to abut on the end of a side opposite to the image carrier of the intermediate transfer member 74. The cleaner 92 for the intermediate transfer member includes the scraper 94 for scraping out and cleaning the toner remaining on the intermediate transfer member 74 after, for instance, the secondary transfer, the brush roll 96 for further scraping out the toner remaining after the cleaning operation by the scraper 94 and a waste toner recovery bottle 98 for recovering the toner scraped by the scraper 94 and the brush roll 96. The scraper 94 is made of, for instance, a stainless steel thin plate and voltage of reverse polarity to that of the toner is applied to the scraper 94. The brush roll 96 is made of, for instance, an acrylic brush that undergoes an electric conductive process. While the intermediate transfer member 74 conveys the toner image, the scraper 94 and the brush roll 96 are separated from the intermediate transfer member 74 and they integrally abut on the intermediate transfer member 74 at a prescribed timing.

In the upper part of the secondary transfer position, the fixing device 100 is disposed. The fixing device 100 includes a heating roll 102 and a pressing roll 104 to fix the toner image secondarily transferred to the sheets by the secondary transfer roll 88 and the secondary transfer backup roll 82 to the sheets and convey the sheets to the delivery roll 40.

In the image forming apparatus main body 12, a control part 106 for controlling parts respectively forming the image forming apparatus 10 is disposed.

An image carrier unit 108 is integrally composed of the image carrier 54, the charging device 60 and the cleaner 62 for the image carrier. Further, an image forming unit 110 is integrally composed of the image carrier unit 108, the intermediate transfer device 72 and the cleaner 92 for the intermediate transfer member. Further, a fixing unit 112 is integrally composed of the fixing device 100 and a delivery roll 40.

Figure 3:
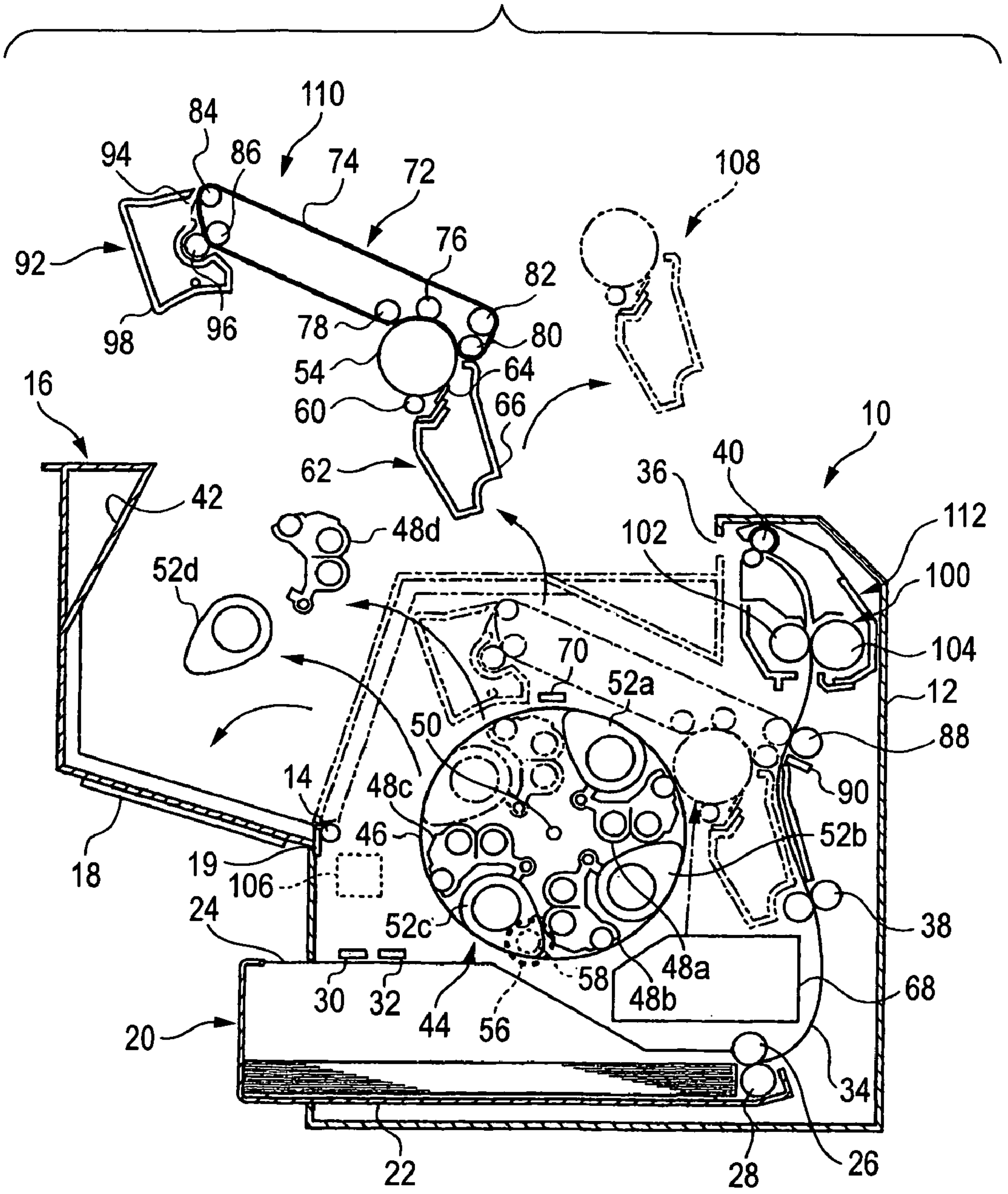
FIG. 3 is a side view showing a state that replaceable units of the image forming apparatus according to the embodiment of the present invention are detached from an image forming apparatus main body.

As shown in FIG. 3, the image forming unit 110 is detachably attached to the image forming apparatus main body 12 and detached and attached by opening the opening and closing cover 16. Further, the image carrier unit 108 is detachably attached to the image forming unit 110.

When the opening and closing cover 16 is opened so that the toner cartridges 52*a* to 52*d* are located in the front surface side (the opening and closing cover 16 side), the toner cartridges 52*a* to 52*d* are detachably attached to the developing devices 38*a* to 48*d* mounted on the developing device unit main body 46. When the opening and closing cover 16 is opened so that the developing devices 48*a* to 48*d* are located in the front surface side (the opening and closing cover 16 side), the developing devices 48*a* to 48*d* are detachably attached to the developing device unit main body 46.

The fixing unit 112 is detached from and attached to the image forming apparatus main body 12 by removing an upper cover that is not illustrated. Further, other units such as the developing device unit 44 and the sheet feed unit 20 are also detachably attached to the image forming apparatus main body 12.

As described above, each unit can be exchanged or replaced by the user. On the other hand, when the user mounts a replaceable unit on the image forming apparatus 10, if a product other than a perfect product is mounted on the image forming apparatus 10, inconveniences that a good image quality cannot be maintained or an operation cannot be assured may arise. This situation arises, because the image forming apparatus 10 is controlled in accordance with the characteristics of members used in the image forming apparatus 10. Thus, a sensor or the like for detecting prescribed conditions is provided in the units that can be replaced by the user.

When a plurality of components such as the developing devices 48*a* to 48*d* is shown without specifying any of them, they may be simply abbreviated as a "developing device 48", hereinafter.

Now, an example of the replaceable unit having the sensor or the like for detecting the prescribed conditions will be described below.

Figure 4:
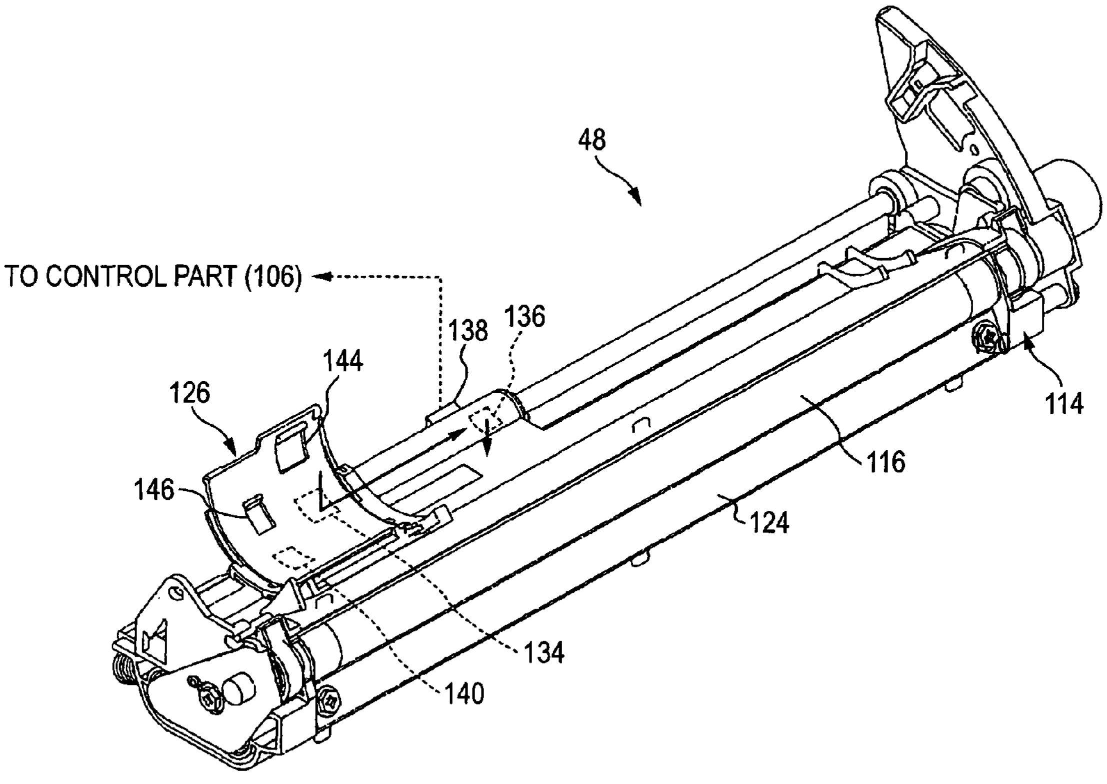
FIG. 4 is a perspective view showing a developing device of the image forming apparatus according to the embodiment of the present invention.
Figure 5:
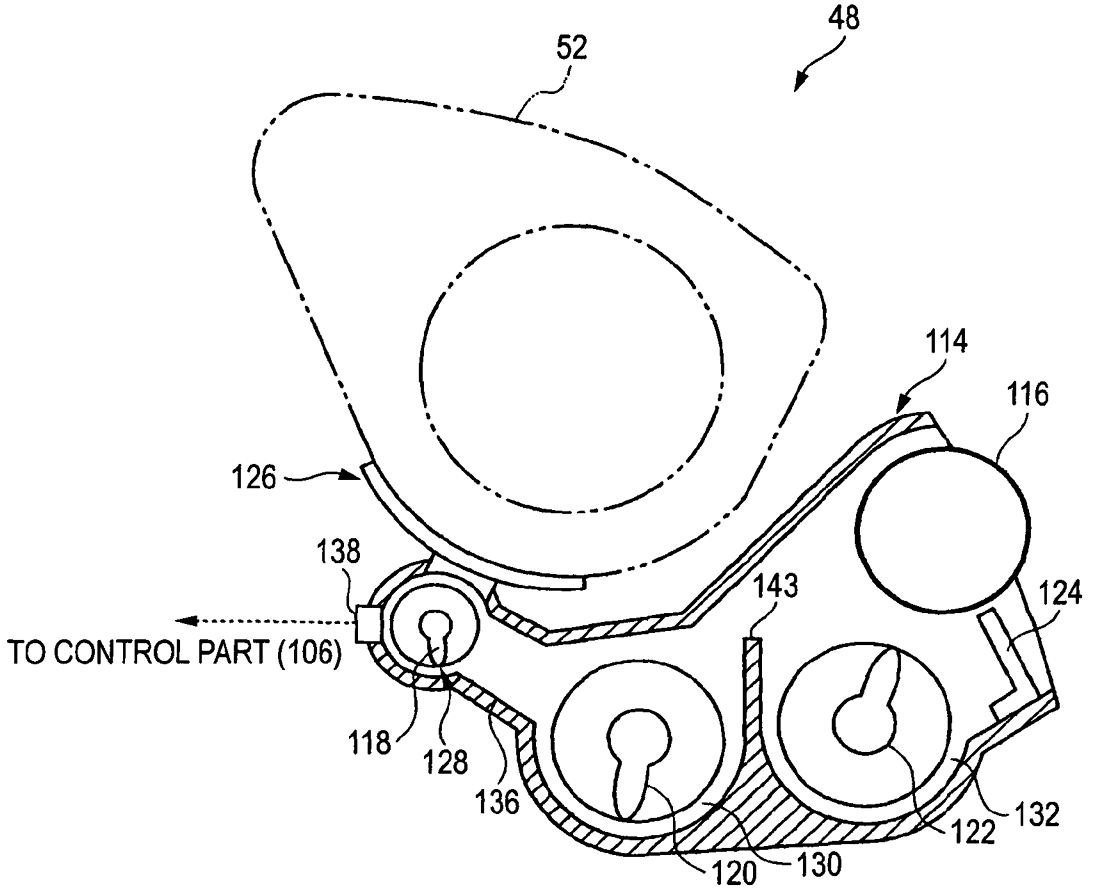
FIG. 5 is a schematic view showing a section of the developing device of the image forming apparatus according to the embodiment of the present invention.

In FIGS. 4 and 5, the structure of the developing device 48 as the replaceable unit is shown.

The developing device 48 includes a developing roll 116 as a developer carrier disposed in the image carrier 54 side of a developing device housing (a developing device main body) 114, a first auger 118, a second auger 120, a third auger 122 and a thickness regulating member 124 to contain a developer composed of two components of, for instance, non-magnetic toner and a magnetic carrier.

The developing device housing 114 includes a shutter 126 for opening and closing a below-described toner inlet port 134 and a developer exhaust port 140, a tubular taking-in and conveying passage 128 for conveying toner taken in from the toner cartridge 52 and tubular developer conveying passages 130 and 132 for agitating and conveying the toner and the carrier.

The taking-in and conveying passage 128 has the toner inlet port 134 for receiving the toner from the toner cartridge 52 and a toner feed port 136 for feeding the toner to the developer conveying passage 130. In the taking-in and conveying passage 128, the first auger 118 is disposed. The first auger 118 conveys the toner received by the toner taking-in and conveying passage 128 from the toner cartridge 52 to the developer conveying passage 130. The rotation of the first auger 118 is adjusted so that a quantity of toner supplied to the developing device 48 from the toner cartridge 52 is adjusted. Thus, the driving time or the rotating speed of the first auger 118 may be accumulated by a below-described CPU 202 so that a quantity of use of the toner (a quantity of use of the toner cartridge 52) is calculated. Further, the quantity of use of the toner may be calculated in such a manner that electric current supplied when the exposure device 68 writes an electrostatic latent image on the image carrier 54 is stored in a capacitor as electric charge and the number of times that the stored electric charge reaches a prescribed quantity is counted by the CPU 202.

In the taking-in and conveying passage 128, a toner presence/absence detecting sensor 138 is provided between the toner inlet port 134 and the toner feed port 136. The toner presence/absence detecting sensor 138 detects the change of a resistance value due to the presence and/or absence of the toner between, for instance, two points in the taking-in and conveying passage 128 to detect the presence and/or absence of the toner. The toner presence/absence detecting sensor 138 may be a piezoelectric element.

The developer conveying passage 130 has the developer exhaust port 140 for exhausting surplus developer to the toner cartridge 52. In the developer conveying passage 130, the second auger 120 is disposed. The second auger 120 agitates and mixes the toner and the carrier conveyed through the taking-in and conveying passage 128 to convey the mixed toner and carrier to the developer conveying passage 132.

In the developer conveying passage 132, the third auger 122 is disposed. The third auger 122 agitates and conveys the developer conveyed through the developer conveying passage 130 to supply the agitated developer to the developing roll 116.

Between the developer conveying passage 130 and the developer conveying passage 132, a partition plate 143 is provided. In both ends of the partition plate 143, a passage (not shown) for connecting the developer conveying passage 130 to the developer conveying passage 132 is provided. Accordingly, the second auger 120 and the third auger 122 convey the developer in alternate directions so that the toner is frictionally electrified by the carrier to a quantity of electrification with a prescribed polarity and circulated in the developing device housing 114. Further, the deteriorated developer is delivered to the toner cartridge 52 from the developer exhaust port 140 at a prescribed timing. Thus, the total life of the developer is lengthened (a trickle developing system).

The shutter 126 has opening parts 144 and 146. The opening part 144 is overlapped on the toner inlet port 134 to form a toner passage from the toner cartridge 52 to the developing device 48. The opening part 146 is overlapped on the developer exhaust port 140 to form a passage for surplus developer from the developing device 48 to the toner cartridge 52.

The developing roll 116 carries the toner to abut on the image carrier 54 to develop the electrostatic latent image carried by the image carrier 54 with the toner. The thickness regulating member 124 regulates the thickness of the toner carried by the developing roll 116.

Figure 6:
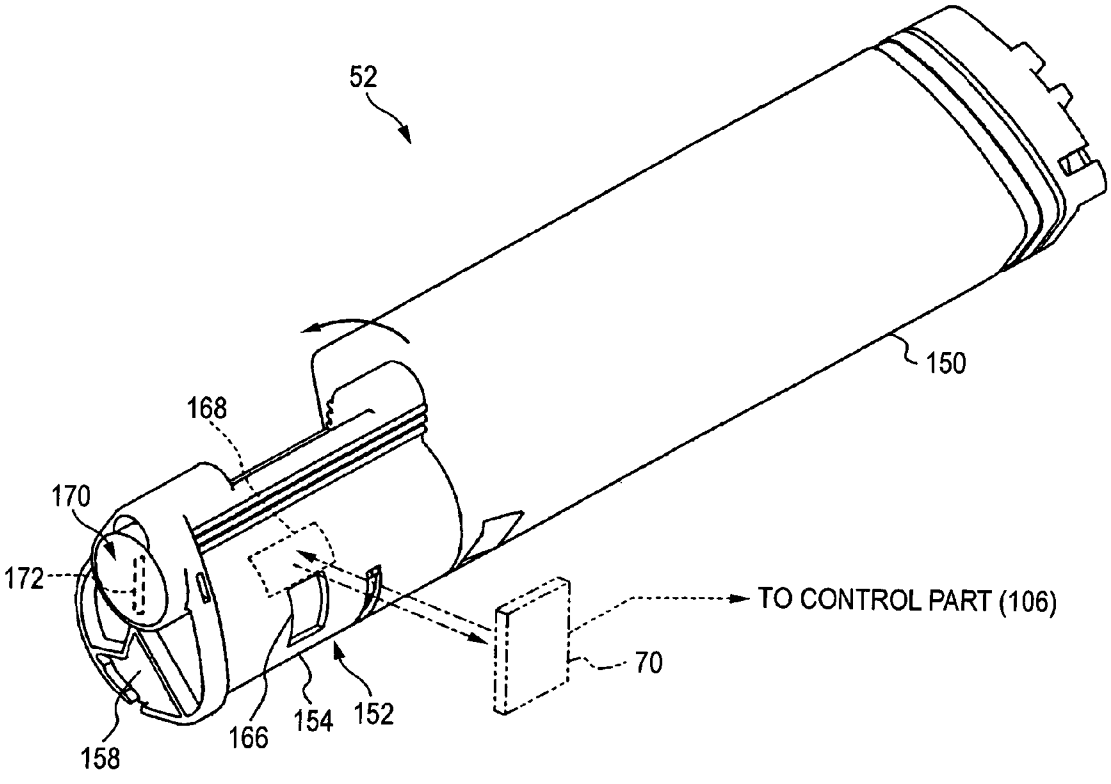
FIG. 6 is a perspective view showing a toner cartridge of the image forming apparatus according to the embodiment of the present invention.
Figure 7:
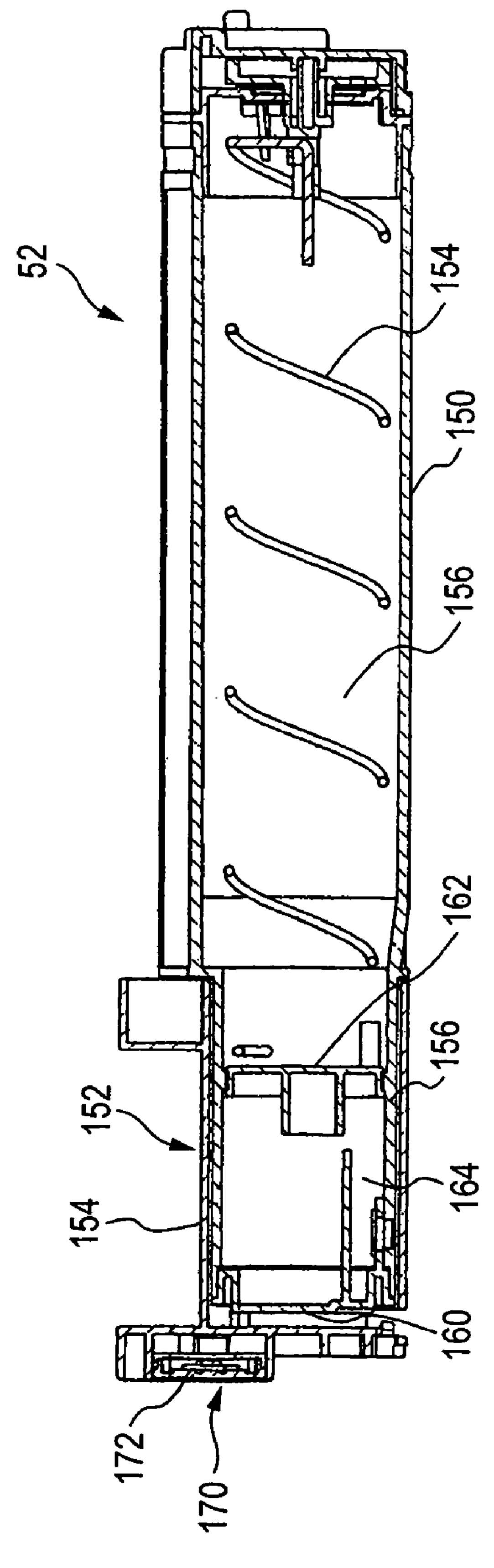
FIG. 7 is a sectional view showing the toner cartridge of the image forming apparatus according to the embodiment of the present invention.

In FIGS. 6 and 7, the structure of the toner cartridge 52 as the replaceable unit is shown.

The toner cartridge 52 includes a toner cartridge main body 150 and a rotating part 152 provided at one end in the longitudinal direction of the toner cartridge main body 150.

The toner cartridge 52 is formed in a tubular shape and includes, as an integral body, a substantially cylindrical part in which an agitating and conveying part 154 is disposed and a part that extends from the substantially cylindrical part substantially perpendicularly to the longitudinal direction and is gradually narrowed. Further, when the toner cartridge 52 is mounted on the developing device unit main body 46 through the developing device 48, the toner cartridge main body 150 is allowed to have its outer surface substantially corresponding to the outer periphery of the developing device unit main body 46.

In the toner cartridge main body 150, a toner accommodating space 156 for accommodating the toner supplied to the developing device 48 is formed. In the toner accommodating space 156, the above-described agitating and conveying member 154 is provided. The agitating and conveying member 154 is, for instance, wound spirally to agitate the toner in the toner accommodating space 156 and convey the toner to the toner inlet port 134 of the developing device 48.

The rotating part 152 includes a rotating part main body 154 and a cylindrical tubular part 156 provided in the rotating part main body 154 and formed integrally with the toner cartridge main body 150. The tubular part 156 has a side surface 158 side of the rotating part main body 154 closed by a side wall 160 of the tubular part and an insolating wall 162 provided therein. In the side wall 160 side of the tubular part of the isolating wall 162, a developer recovery space 164 for recovering the surplus developer from the developing device 48 is formed. In a side opposite to the sidewall 160 side of the isolating wall 162, the above-described toner accommodating space 156 is extended and formed.

The rotating part main body 154 has a window part 166 covered with a transparent member. The window part whose inside is cylindrically formed is rotated along the outer surface of the cylindrical part of the tubular part 156. Further, On the outer surface of the cylindrical part of the tubular part 156, a reflecting member 168 such as a white tape is attached. When the toner cartridge 52 is mounted on the developing device 48 and the rotating part main body 154 is rotated, the reflecting member 168 is exposed through the window part 166. Further, in the image forming apparatus main body 12, when the developing device unit 44 on which the toner cartridge 52 is mounted is rotated, the exposed reflecting member 168 is allowed to pass a position opposed to the unused state detecting sensor 70 fixed to the image forming apparatus main body 12. As described above, the unused state detecting sensor 70 is, for instance, the reflection type photo-sensor. The unused state detecting sensor 70 detects a quantity of reflection in the reflecting member 168 changing due to the stain of the toner when the reflecting member 168 of the toner cartridge 52 mounted on the developing device unit 44 passes the position opposed to the unused state detecting sensor 70. Thus, whether or not the toner cartridge 52 is unused is detected.

On the side surface part 158 of the rotating part main body 154, a memory chip 170 is attached. The memory chip 170 has an antenna 172 to perform a radio telecommunication with the radio telecommunication part 56 provided in the image forming apparatus main body 12 side.

Now, as for the radio telecommunication part 56 and the memory chip 170, the circuit structures of them and a communication performed between them will be described below.

Figure 8:
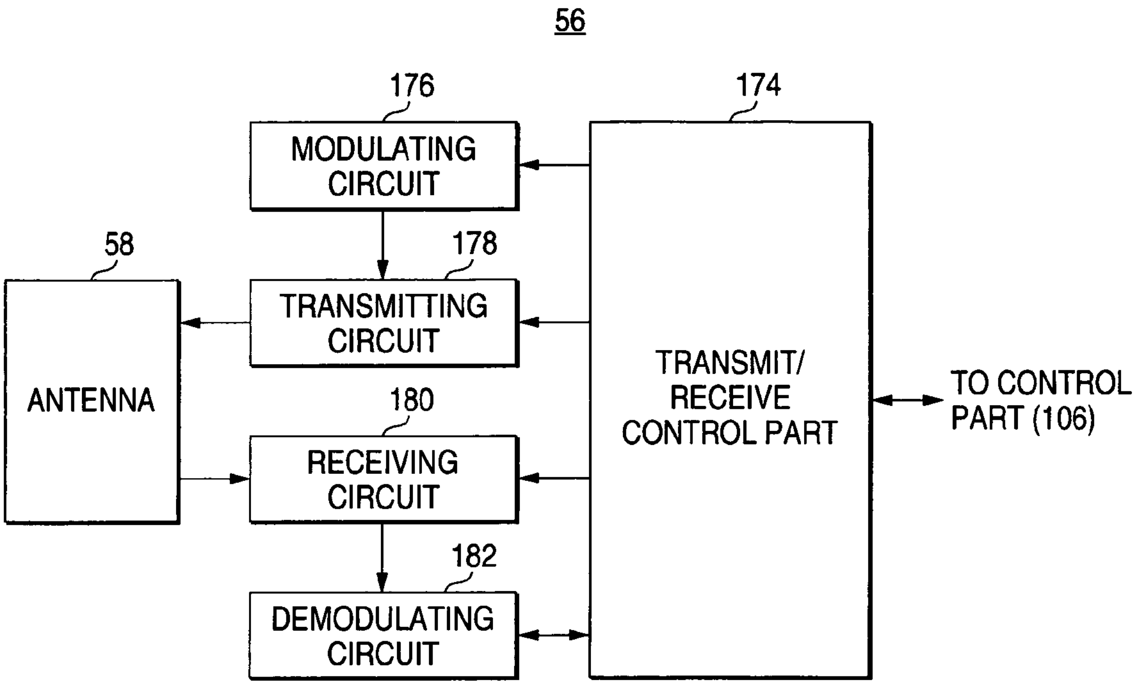
FIG. 8 is a block diagram showing a circuit structure of a radio telecommunication part of the image forming apparatus according to the embodiment of the present invention.
Figure 9:
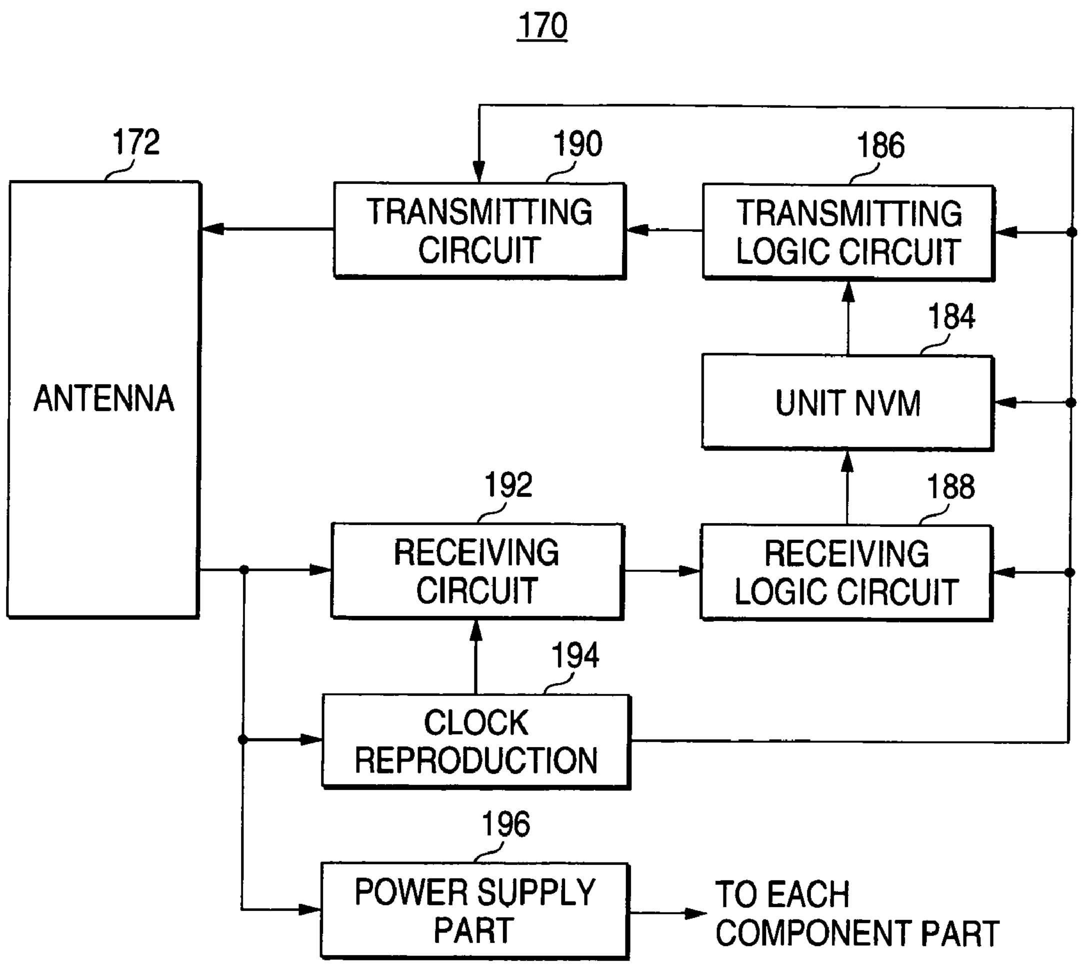
FIG. 9 is a block diagram showing a circuit structure of a memory chip of the toner cartridge used in the image forming apparatus according to the embodiment of the present invention.

FIG. 8 is a block diagram showing the circuit structure of the radio telecommunication part 56. FIG. 9 is a block diagram showing the circuit structure of the memory chip 170.

As shown in FIG. 8, the circuit of the radio telecommunication part 56 includes a transmit/receive control part 174, a modulating circuit 176, a transmitting circuit 178, a receiving circuit 180, a demodulating circuit 182 and an antenna 58. In the radio telecommunication part 56, the transmit/receive control part 174 controls the operations of the respective parts of the radio telecommunication part 56. Then, the transmit/receive control part 174 outputs data inputted from the control part 106 to the modulating circuit 176. Further, the transmit/receive control part 174 outputs data received by the receiving circuit 180 and demodulated by the demodulating circuit 182 to the control part 106. The modulating circuit 176 modulates the data inputted from the transmit/receive control part 174 and outputs the data to the transmitting circuit 178. The transmitting circuit 178 outputs a radio signal including data and a clock signal or the like stored in the memory chip 170 to the memory chip 170 through the antenna 58.

The receiving circuit 180 receives the signal transmitted from the memory chip 170 through the antenna 58 and outputs the signal to the demodulating circuit 182. The demodulating circuit 182 demodulates the data transmitted by the memory chip 170 in accordance with the change of the signal inputted from the receiving circuit 180 and outputs the demodulated data to the transmit/receive control part 174.

As shown in FIG. 9, the circuit of the memory chip 170 includes a unit NVM (Non Volatile memory) 184, a transmitting logic circuit 186, a receiving logic circuit 188, a transmitting circuit 190, a receiving circuit 192, a clock reproducing circuit 194, a power supply part 196 and the antenna 172.

When the radio signal is transmitted to the memory chip 170 from the radio telecommunication part 56, the receiving circuit 192, the clock reproducing circuit 194 and the power supply part 196 receive the radio signal through the antenna 172. In the memory chip 170, when the power supply part 196 receives the radio signal, the power supply part 196 rectifies electric current generated by an electromagnetic induction due to the radio signal to supply electric power necessary for the operations of the components of the memory chip 170 respectively to these components. When the memory chip 170 requires voltage higher than voltage generated by, for instance, the power supply part 196, the memory chip 170 may receive the supply of electric power from a main body part 40. For instance, a coil for a power supply may be further provided in the memory chip 170 to supply the electric power to the memory chip 170 under a non-contact state from alternating current supplied to the developing device unit 44.

When the clock reproducing circuit 194 receives the radio signal, the clock reproducing circuit 194 reproduces the clock signal and outputs the clock signal to the circuits respectively forming the memory chip 170. When the receiving circuit 192 receives the radio signal, the receiving circuit 192 outputs a signal such as the data included in the radio signal to the receiving logic circuit 188 synchronously with the clock signal inputted from the clock reproducing circuit 194. The receiving logic circuit 188 demodulates the signal such as the data inputted from the receiving circuit 192 synchronously with the clock signal inputted from the clock reproducing circuit 194 and outputs the demodulated signal to the unit NVM 184.

The unit NVM 184 is a non-volatile memory in which data can be written. When the signal inputted from the receiving logic circuit 188 synchronously with the clock signal inputted from the clock reproducing circuit 194 indicates the writing of data, the data is written (stored) When the signal indicates the reading of the data, the data stored in the unit NVM 184 is outputted to the transmitting logic circuit 186. The non-volatile memory included in the unit NVM 184 may be, for instance, a flash ROM, an EEPROM or an FeRAM (ferroelectric memory).

The transmitting logic circuit 186 modulates the data inputted from the unit NVM 184 synchronously with the clock signal inputted from the clock reproducing circuit 194 and outputs the modulated data to the transmitting circuit 190. The transmitting circuit 190 transmits the signal inputted from the transmitting logic circuit 186 synchronously with the clock signal inputted from the clock reproducing circuit 194 to the radio telecommunication part 56 through the antenna 172 as the radio signal.

The signal transmitted and received as the radio signal may be encoded, and then, the encoded signal may be converted to a radio signal to be transmitted and received. Further, for instance, a permitted user may use the encoded radio signal to rewrite the contents of the unit NVM 184 from a device except the control part 106.

Figure 10:
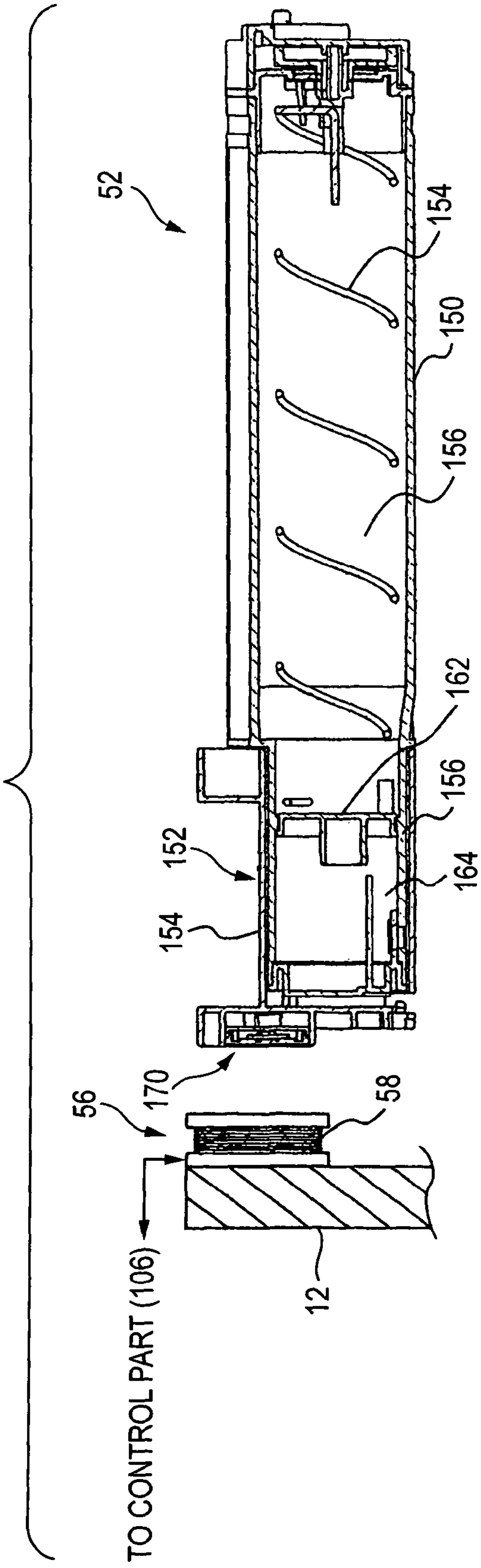
FIG. 10 is a sectional view showing the positional relation of the radio telecommunication part and the memory chip performing a radio telecommunication.

FIG. 10 shows a positional relation between the radio communication part 56 and the memory chip 170 that perform a radio telecommunication. As described above, the toner cartridge 52 is mounted on each of the developing devices 48 and moves when the developing device unit 44 (FIG. 2) rotates on the rotating shaft 50 as an axis. The radio telecommunication part 56 is fixed to the image forming apparatus main body 12 near the side of the developing device unit 44 so that the memory chips 170 moving by the rotation of the developing device unit 44 are sequentially substantially opposed to the radio telecommunication part 56. The radio telecommunication part 56 performs a radio telecommunication with the memory chip 170 under a state in which the developing device 48 is controlled to move and stop at a position substantially opposed to any of the memory chips 170 to perform a radio telecommunication between them. Further, the radio telecommunication part 56 receives, for instance, an acknowledge signal transmitted by the memory chip 170 to the radio signal outputted from the radio telecommunication part 56 to recognize the start of transmission and reception of data.

Figure 11:
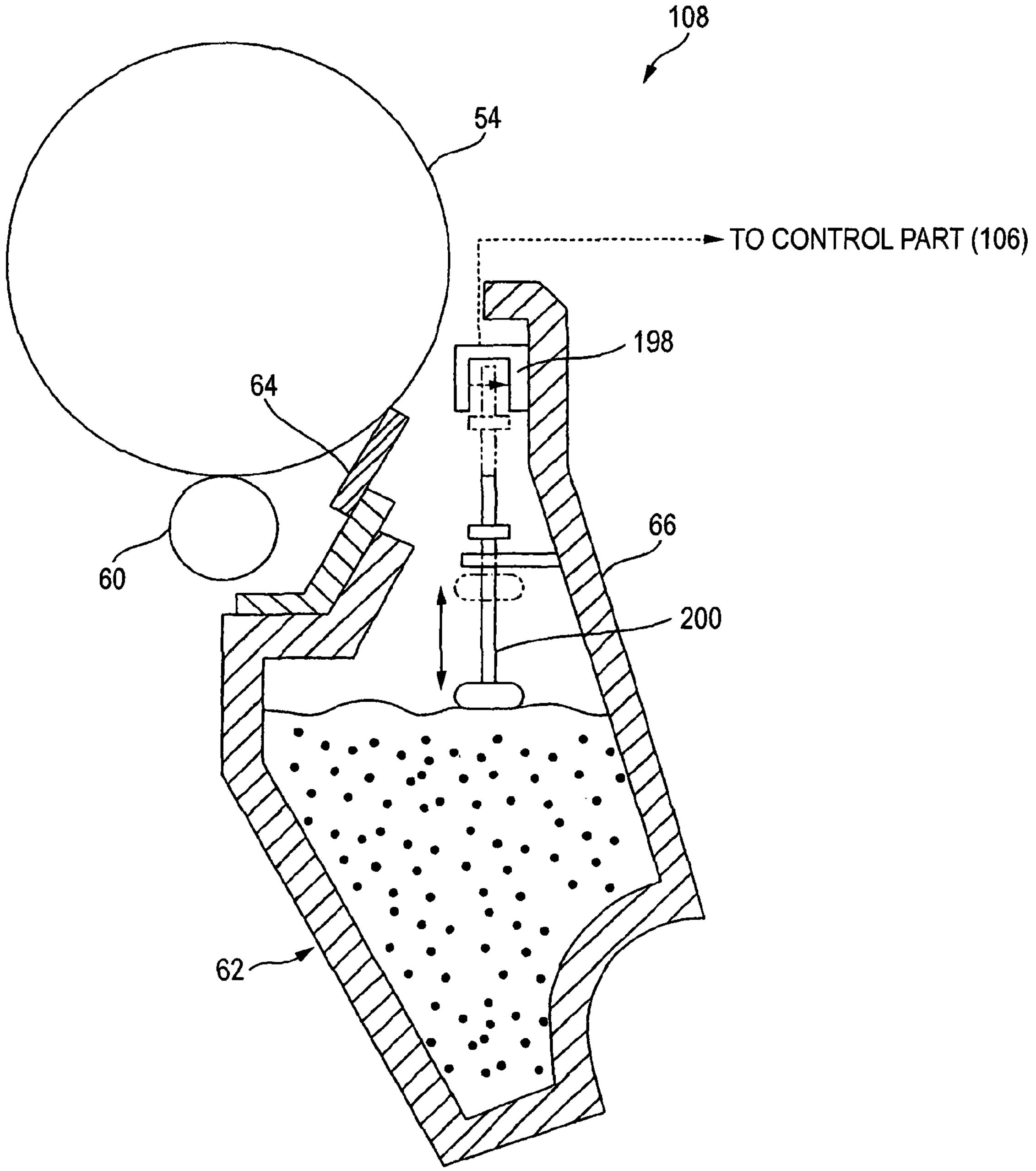
FIG. 11 is a side view showing the structure of an image carrier unit used in the image forming apparatus according to the embodiment of the present invention.

In FIG. 11, the structure of the image carrier unit 108 as the replaceable unit is shown.

As described above, the image carrier unit 108 is constructed by forming integrally the image carrier 54, the charging device 60 and the cleaner 62 for the image carrier. The image carrier unit includes, for instance, a waste toner full capacity sensor 198 disposed in an upper part in the cleaner 62 for the image carrier and a float 200 disposed in the lower part of the waste toner full capacity sensor 198. The waste toner full capacity sensor 198 has an optical path in which the light emission of a light emitting part provided at one part is received by a light receiving part provided at the other part to output whether or not the receiving part receives the light to the control part 106. The float 200 is allowed to lift when the waste toner recovered to the waste toner recovery bottle 66 from the image carrier 54 exceeds a prescribed quantity. When the waste toner recovery bottle 66 is full of the waste toner, the optical path of the waste toner full capacity sensor 198 is interrupted. As described above, the image carrier unit 108 detects whether or not the waste toner recovery bottle 66 is full of the waste toner by the waste toner full capacity sensor 198 and the float 200 to output the detected result to the control part 106.

Further, the waste toner full capacity sensor 198 and the float 200 may be provided in the cleaner 92 for the intermediate transfer member to detect whether or not the waste toner recovery bottle 98 is full of the waste toner.

As described above, the replaceable unit having the sensor for detecting prescribed conditions outputs results detected by the sensor to the control part 106. The control part 106 controls parts respectively forming the image forming apparatus 10 on the basis of the inputted detected results.

Now, the structure of the control part 106 will be described below in detail.

Figure 12:
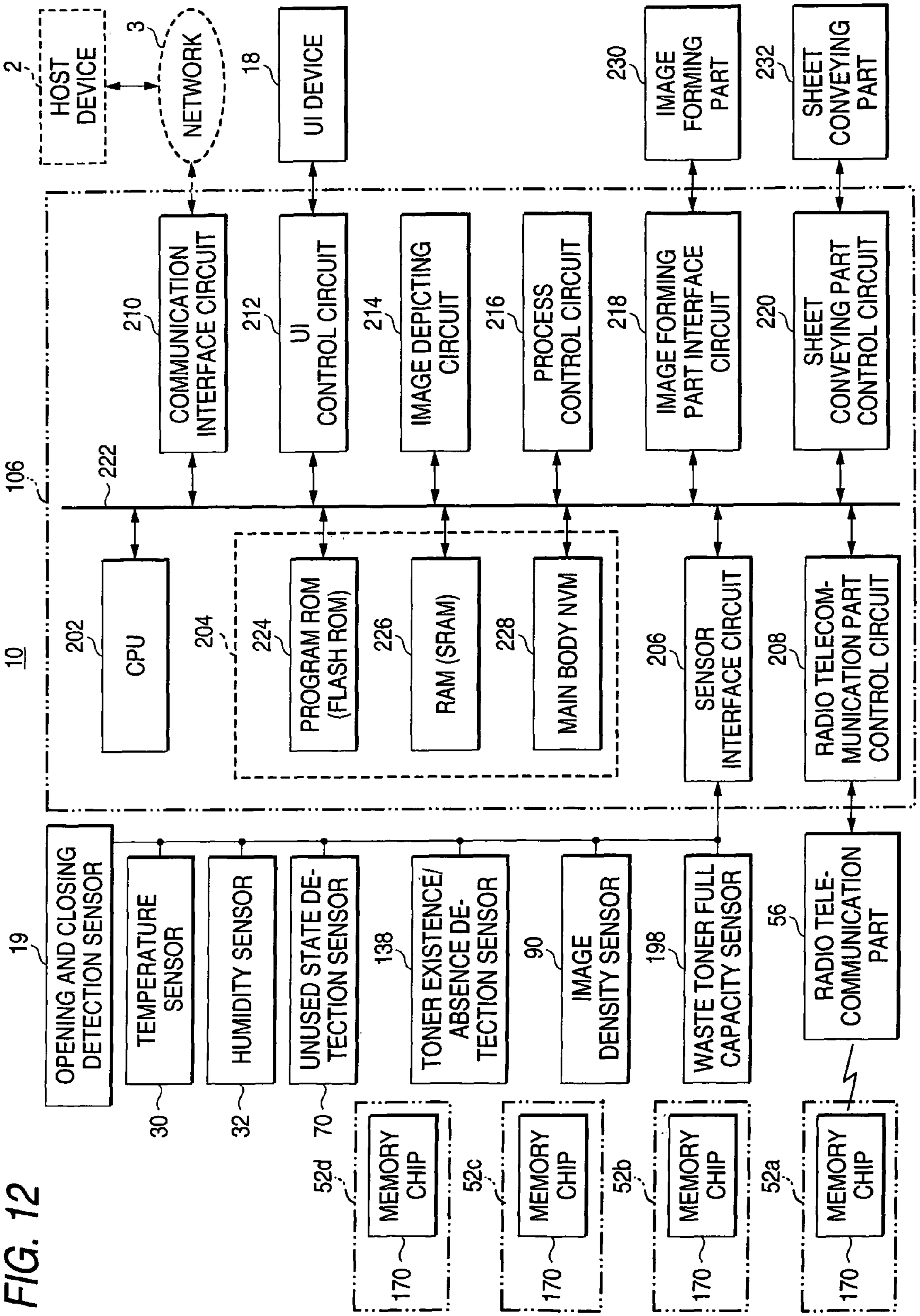
FIG. 12 is a block diagram showing the structure of a control part of the image forming apparatus according to the embodiment of the present invention and parts respectively connected to the control part.

FIG. 12 is a block diagram showing the structure of the control part 106 and parts connected to the control part 106.

The control part 106 includes a CPU 202, a storing part 204, a sensor interface (sensor I/F) circuit 206, a radio telecommunication part control circuit 208, a communication interface (communication I/F) circuit 210, a user interface (UI) control circuit 212, an image depicting circuit 214, a process control circuit 216, an image forming part interface (image forming I/F) circuit 218 and a sheet conveying part control circuit 220. These members can mutually input and output signals through a system bus 222.

The CPU 202 transmits signals to and receives signals from the parts respectively forming the control part 106 through the system bus 222 to control the parts respectively forming the control part 106.

The storing part 204 includes, a program ROM 224, a RAM 226, and a main body NVM (Non Volatile Memory) 228 to store information necessary for controlling the image forming apparatus. 10. The program ROM 224 may be formed with, for instance, a flash ROM to update the contents of memory. The RAM 226 is composed of, for instance, a SRAM to store temporary information such as image depicting data inputted from the image depicting circuit 214. The main body NVM 228 is composed of, for instance, a non-volatile memory capable of being electrically rewritten such as an EEPROM or a flash ROM. The main body NVM 228 is a storage device capable of being rewritten and may be a SRAM, an HDD (Hard Disk Drive) or an optical memory backed up by a battery which can hold data even when the power source of the image forming apparatus 10 is turned off.

The sensor I/F circuit 206 receives detected results respectively from the opening and closing detecting sensor 19, the temperature sensor 30, the humidity sensor 32, the unused state detecting sensor 70, the toner presence/absence detecting sensor 138, the image density sensor 90 and the waste toner full capacity sensor 198 to output the detected results to the CPU 202 through the system bus 222. The radio telecommunication part control circuit 208 transmits a signal to and receives a signal from the four memory chips 170 respectively provided in the toner cartridges 52*a* to 52*d* through the radio telecommunication part 56. The radio telecommunication part control circuit 208 transmits a signal to and receives a signal from the CPU 202 and the storing part 204 through the system bus 222 to connect the memory chips 170 respectively to the CPU 202 and the storing part 204.

The communication I/F circuit 210 transmits a signal to and receives a signal from the host device 2 through the network 3 and transmits and receives a signal between the CPU 202 and the communication I/F circuit through the system bus 222 to connect the host device 2 to the CPU 202. The UI control circuit 212 transmits a signal to and receives a signal from the UI device 18 and transmits a signal and receives a signal from the CPU 202 through the system bus 222 to connect the UI device 18 to the CPU 202.

The image depicting circuit 214 depicts an image on the basis of an image forming signal inputted from the host device 2 to output the image to the CPU 202 and the RAM 226. The process control circuit 216 refers to a below-described setting value stored in the storing part 204 together with the CPU 202 to control an image forming part 230 including the exposure device 68, the image forming unit 110 and the developing device unit 44 or the like through the image forming I/F circuit 218. The sheet conveying part control circuit 220 controls a sheet conveying part 232 including the feed roll 26, the retard roll 28 and the resist roll 38 together with the CPU 202.

The CPU 202 compares data stored in the storing part 204 with data stored in the unit MVM 184 so that the state of the toner cartridge 52 to which the memory chip 170 is attached can be decided. Thus, even when the memory chip 170 is not provided with a sensor, the memory chip 170 can form a part of a detecting unit.

Now, the detail of data stored in the program ROM 224, the main body NVM 228 and the unit NVM 184 will be described below.

Figure 13:
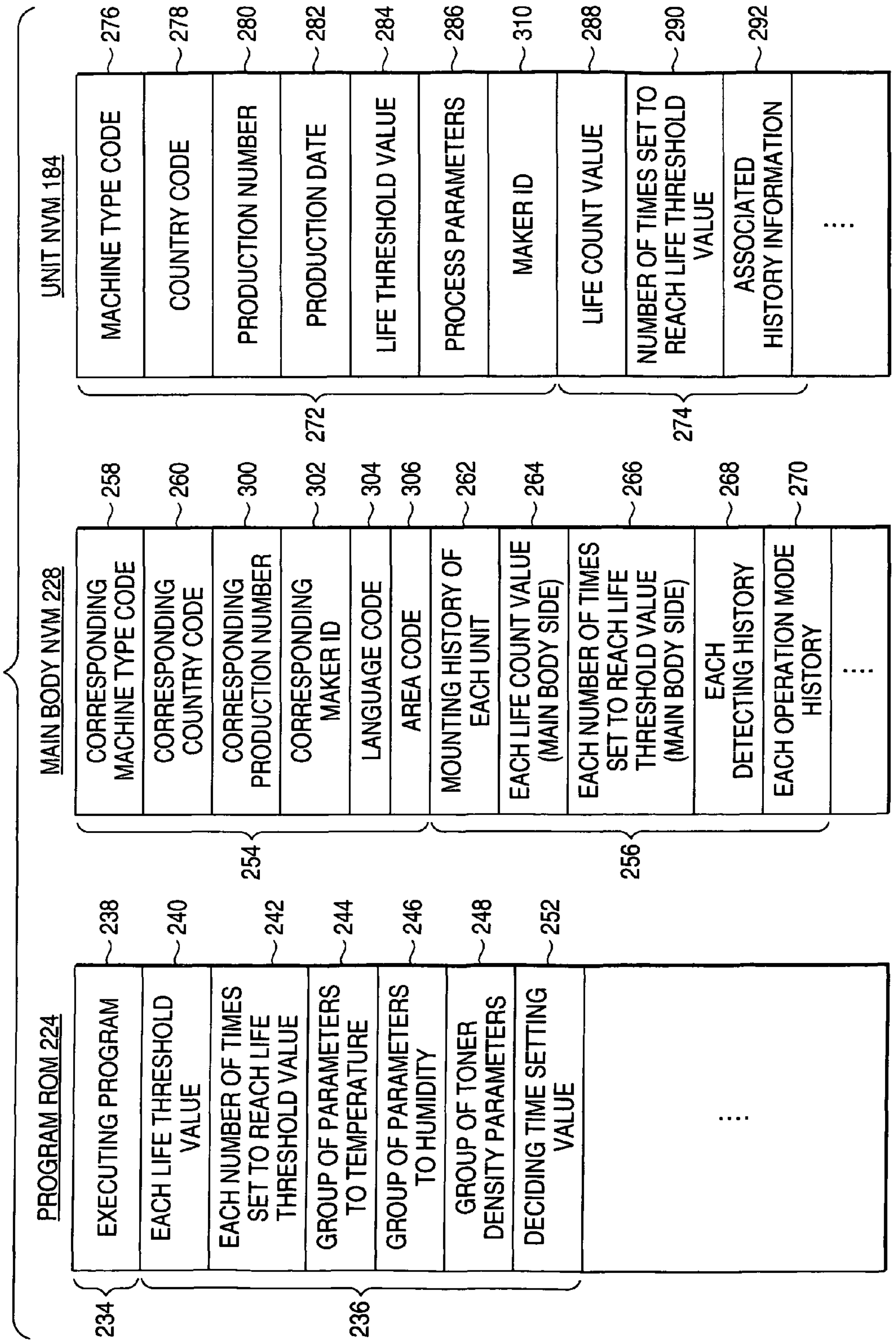
FIG. 13 is a memory map showing data stored in a program ROM, a main body NVM and a unit NVM.

In FIG. 13, examples of the data stored in the program ROM 224, the main body NVM 228 and the unit NVM184 are shown.

In the program ROM 224, a program area 234 and a setting value area 236 are provided. In the program area 234, an executing program 238 for operating the image forming apparatus 10 is stored. In the setting value area 236, each life threshold value 240, each number of times set to reach the life threshold value 242, a group of parameters to temperature 244, a group of parameters to humidity 246, a group of toner density parameters 248 and a deciding time setting value 252 or the like are stored.

Each life threshold value 240 includes the life (life threshold value) of each of the replaceable units of the image forming apparatus 10. Each number of times set to reach the life threshold value 242 includes the number of times that each of the replaceable units of the image forming apparatus 10 is permitted to reach the life threshold value. The group of parameters to temperature 244 includes each of parameters related to a control to the temperature of the image forming apparatus 10. The group of parameters to humidity 246 includes each of parameters related to a control to the humidity of the image forming apparatus 10. The group of toner density parameters 248 includes each of parameters related to a control of the toner density in the developing device 48. The deciding time setting value 252 includes a time (deciding time) until the CPU 202 starts to decide whether each of the replaceable units of the image forming apparatus 10 is a perfect product or a product other than the perfect product in a below-described process (FIG. 17) in which the image forming apparatus 10 prepares for a printing operation adapted to an operation mode.

Here, the operation mode means a control state including not only programs or control parameters for forming an image, but also input conditions or output conditions. Further, the operation mode includes a display state on a display device that is not directly related to the formation of the image.

In the main body NVM 228, a corresponding unit information area 254 and a main body side updating area 256 are provided.

In the corresponding unit information area 254, a corresponding machine type code 258, a corresponding country code 260, a corresponding production number 300, a corresponding maker ID 302, a language code 304 and an area code 306 are stored. The corresponding machine type code 258 stores a table (data) of machine types showing the machine types adapted to the image forming apparatus 10 respectively for the replaceable units of the image forming apparatus 10. The corresponding country code 260 stores a table (data) of countries in which different specifications for the countries are respectively set to the replaceable units of the image forming apparatus 10. The corresponding production number 300 stores production numbers or the table (data) of a range of the production numbers showing machine types adapted to the image forming apparatus 10 respectively for the replaceable units of the image forming apparatus 10. The corresponding maker ID 302 stores a table (data) of makers showing the makers adapted to the image forming apparatus 10 respectively for the replaceable units of the image forming apparatus 10. The language code 304 stores a table (data) of languages showing the languages adapted to the image forming apparatus 10 respectively for the replaceable units of the image forming apparatus 10. The area code 306 stores a table (data) of areas in which different specifications respectively for the areas are set to the replaceable units of the image forming apparatus 10.

The data stored in the corresponding unit information area 254 may be written after the image forming apparatus 10 is shipped and may not be written upon shipping.

In the main body side updating area 256, a mounting history of each unit 262, each life count value of a main body side 264, each number of times set to reach a life threshold value in a main body side 266, each detecting history 268 and each operation mode history 270 are stored. The mounting history of each unit 262 includes mounting histories of the replaceable units of the image forming apparatus 10. Further, in an initial state (initial value) of the mounting history of each unit 262, a fact that a perfect product is mounted is stored. Each life count value of a main body side 264 includes life count values (a quantity of use from a start of use to a present time) respectively for the replaceable units of the image forming apparatus 10. The quantity of use of each unit may be calculated from a cumulative operating time of each of units. Each number of times set to reach a life threshold value in a main body side 266 includes the numbers of times permitted to reach the life threshold values respectively for the replaceable units of the image forming apparatus 10. Each detecting history 268 includes the history of a detected result detected by each sensor provided in the image forming apparatus 10. Each operation mode history 270 includes the histories of operation modes respectively applied to the replaceable units of the image forming apparatus 10.

In the unit NVM 184, a unit information area 272 and a unit side updating area 274 are provided.

In the unit information area 272, a machine type code 276 showing a machine type, a country code 278 showing countries to which specifications are set, a production number 280 peculiar to a unit, production date 282, a life threshold value 284 showing the life of a unit, a process parameter 286 for controlling a process and a maker ID 310 are stored.

In the unit side updating area 274, a life count value 288 showing a quantity of use from a start of use of the toner cartridge 52 to a present time, number of times set to reach the life threshold value 290 showing the number of times permitted to reach the life threshold value stored in the life threshold value 284 and associated history information 292 are stored. The associated history information 292 includes the history of associated information that can be used to grasp the state of the toner cartridge 52 such as the rotating speed of the image carrier 54.

In the image forming apparatus 10 having the above-described structure, when an image forming signal is supplied, the image carrier 54 is uniformly charged by the charging device 60. To the charged image carrier 54, light is outputted from the exposure device 68 in accordance with an image signal. The light from the exposure device 68 exposes the surface of the image carrier 54 to form a latent image.

The latent image carried by the image carrier 54 is developed by the developing device unit 44 in a developing position. In the developing device unit 44, to the developing devices 48*a* to 48*d*, the toners of yellow, magenta, cyan and black are respectively supplied from the toner cartridges 52*a* to 52*d*. Further, the developer excessively supplied to the developing devices 48*a* to 48*d* is respectively recovered to the toner cartridges 52*a* to 52*d*. The toner images developed respectively for the colors are overlapped and primarily transferred on the intermediate transfer member 74. In the primary transfer, the waste toner remaining on the image carrier 54 is scraped out by the cleaner 62 for the image carrier and recovered.

The sheets accommodated in the sheet feed cassette 24 by a sheet feed signal are fed by the feed roll 26, loosened by the retard roll 28, guided to the conveying passage 34 and temporarily stopped by the resist roll 38. Then, the sheets are guided between the secondary transfer roll 88 and the secondary transfer backup roll 82 at a prescribed timing. When the sheets are guided between the secondary transfer roll 88 and the secondary transfer backup roll 82, the toner image having four colors superimposed on the intermediate transfer member 74 by the primary transfer process is secondarily transferred to the sheets by the secondary transfer roll 88 and the secondary transfer backup roll 82. After the secondary transfer process, the waste toner remaining on the intermediate transfer member 74 is scraped out by the cleaner 92 for the intermediate transfer member and recovered.

The sheets to which the toner image is transferred are guided to the fixing device 100 to fix the toner image on the sheets under thermal pressure by the heating roll 102 and the pressing roll 104. The sheets to which the toner image is fixed are delivered to the delivery part 42 from the delivery port 36 by the delivery roll 40. The control part 106 stores the life count value of the toner cartridge 52 or the like in the unit NVM 184 and the main body NVM 228.

Figure 14:
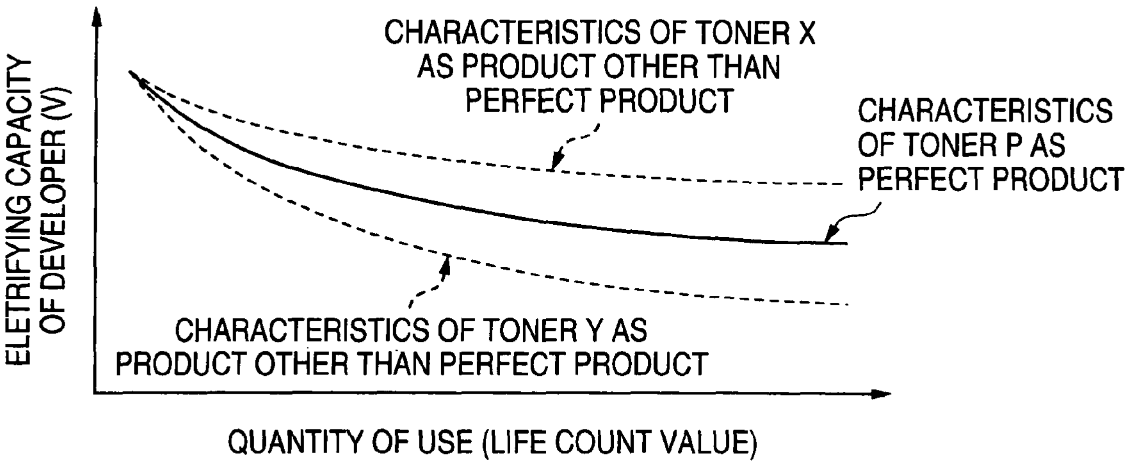
FIG. 14 is a graph showing the change of the electrifying capacity of a developer relative to a quantity of use of the developer (a life count value) stored in the main body NVM.

FIG. 14 is a graph showing the change of the electrifying capacity of the developer relative to a quantity (life count value) of use of the developer stored in the main body NVM 228.

Figure 15:
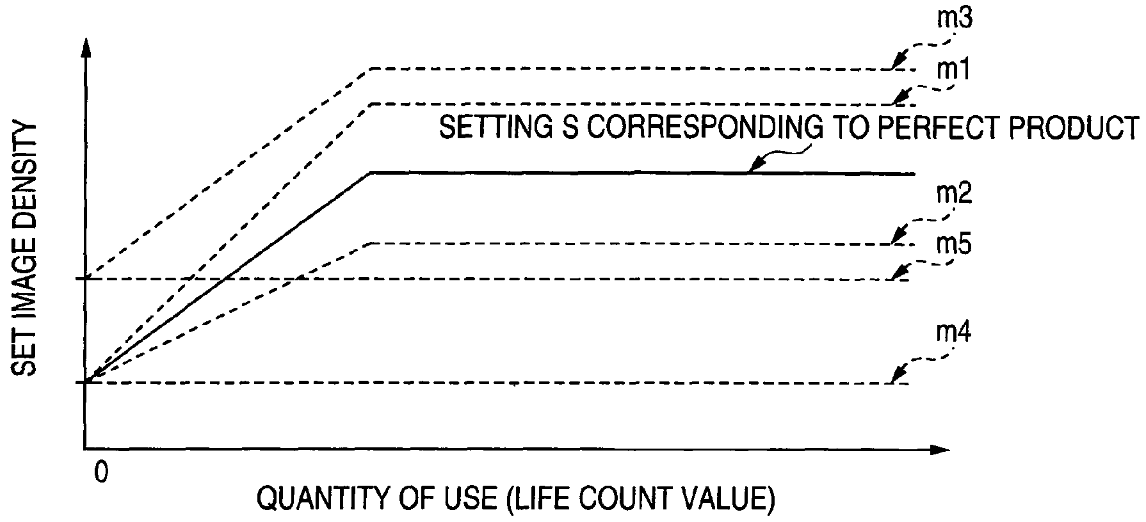
FIG. 15 is a graph showing a setting for correcting the change of the electrifying capacity of the developer and showing the setting of image density relative to the quantity of use of the developer.

FIG. 15 is a graph showing a setting for correcting the change of the electrifying capacity of the developer and showing a setting of image density relative to the quantity of use of the developer.

Figure 16A:
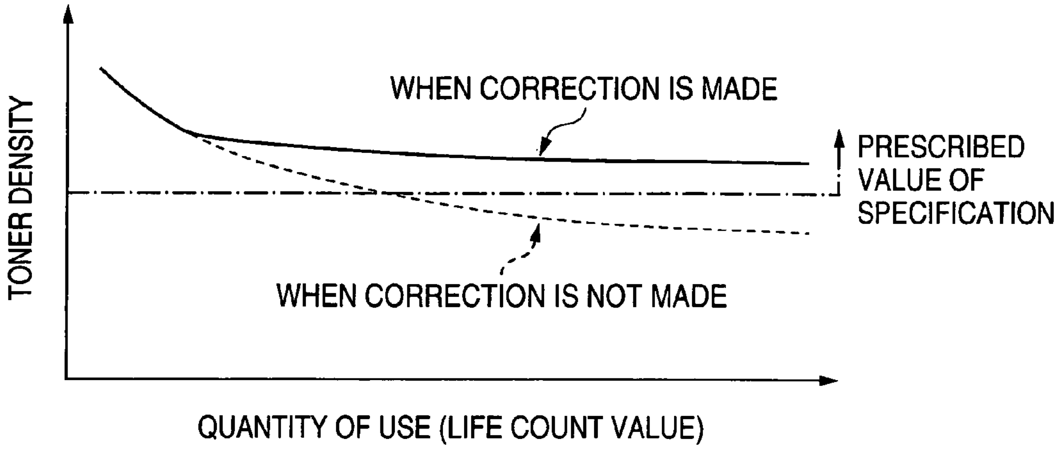
FIGS. 16A and 16B are graphs showing results corrected by the setting shown in FIG. 15.
Figure 16B:
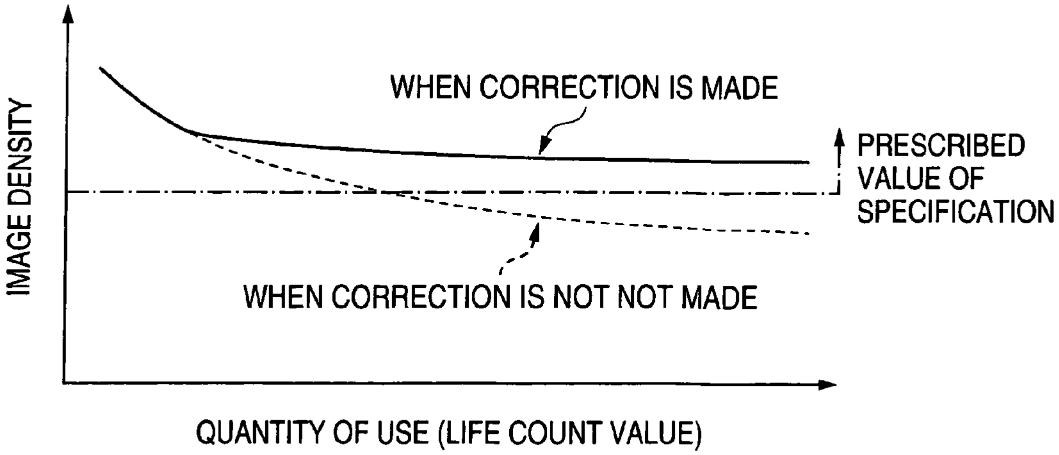

FIGS. 16A and 16B are graphs showing results corrected by the setting shown in FIG. 15. FIG. 16A is a graph showing the corrected toner density and FIG. 16B is a graph showing the corrected image density.

The toner accommodated in the toner cartridge 52 is frictionally electrified to a quantity of electrification with a prescribed polarity by the carrier in the developing device 48. When the developer is used, the electrifying capacity of the developer is lowered in accordance with the quantity of use of the developer like the characteristics of the toner P as a perfect product shown in FIG. 14.

Therefore, even when the image forming apparatus 10 employs the trickle developing system, the settings to the toner density in the developing device 48 and the image density on the intermediate transfer member 74 are corrected to maintain the image quality of an image formed on the sheets to a prescribed level.

For instance, when the CPU 202 detects the image density by the image density sensor 90 and the density is high, the CPU 202 controls the first auger 118 to be driven and rotated so that the quantity of the toner supplied to the developing device 48 is decreased to lower the toner density and lower the image density. Further, when the density is low, the CPU 202 controls the first auger 118 to be driven and rotated so that the quantity of the toner supplied to the developing device 48 is increased to raise the toner density and raise the image density. Ordinarily, as a pattern for detecting the image density, a pattern having intermediate tone density is used.

However, when the electrifying capacity of the toner is lowered, a developing performance is improved to increase the image density. Accordingly, when the above-described control is directly performed, the toner density is excessively lowered to deteriorate maximum image density.

Thus, even when the electrifying capacity of the developer is lowered, a setting value for controlling the toner density in the developing device 48 that is stored in the group of toner density parameters 248 used for controlling the toner density on the basis of the detected results of the image density by the image density sensor 90 is corrected to increase in accordance with the quantity of use of the developer. The CPU 202 controls the first auger 118 to be rotated in accordance with the corrected setting value (FIG. 15: a setting S corresponding to the toner P) to maintain the toner density so that the toner density does not reach a value not higher than a desired prescribed value, as shown in FIG. 16A.

As a result, the image density can be maintained so that the image density does not reach a value not higher than a prescribed value of a specification, as shown in FIG. 16B.

On the other hand, when a toner cartridge other than a perfect product having the substantially same structure as that of the toner cartridge 52 in which toner X or toner Y other than a perfect product is accommodated is mounted on the image forming apparatus 10, different characteristics from the characteristics P of the toner as the perfect product are anticipated to be shown as illustrated in FIG. 14. Accordingly, to improve the image quality of the image formed on the sheets, a setting value corrected to be different from the setting S corresponding to the toner P is necessary. Thus, for instance, when the toner cartridge is the product other than the perfect product in which the toner X or the toner Y is accommodated, a correction is changed relative to the quantity of use of the developer by combining below-described changed conditions. The changed conditions include that the variation (inclination) of the setting value of the toner density is increased or decreased (m1, m2: FIG. 15), a threshold value is increased or decreased (m1, m2), an initial value (quantity of use is zero) is changed (m3), the setting value is not changed correspondingly to the quantity of use (m4) and, for instance, the initial value is changed and the setting value is not changed correspondingly to the quantity of use (m5). This change is carried out by selecting the UI device 18 by a user as an operation mode different from an operation mode corresponding to the perfect product.

Now, a control of the image forming apparatus 10 based on the data stored in the storing part 204 and the unit NVM 184 will be described below.

The image forming apparatus 10 controls a display by the UI device 18 on the basis of the data stored in the storing part 204 and the unit NVM 184. For instance, the UI device 18 displays, under the control of the CPU 202, a residual quantity of the toner when the toner cartridge 52 is the perfect product. When the toner cartridge 52 is the product other than the perfect product, the UI device 18 displays a quantity of use of the toner. When the toner cartridge 52 is the product other than the perfect product, since a quantity of toner is unknown, the residual quantity of the toner cannot be calculated.

Now, a control method of the image forming apparatus 10 based on the data stored in the storing part 204 and the unit NVM 184 will be described below.

Figure 17:
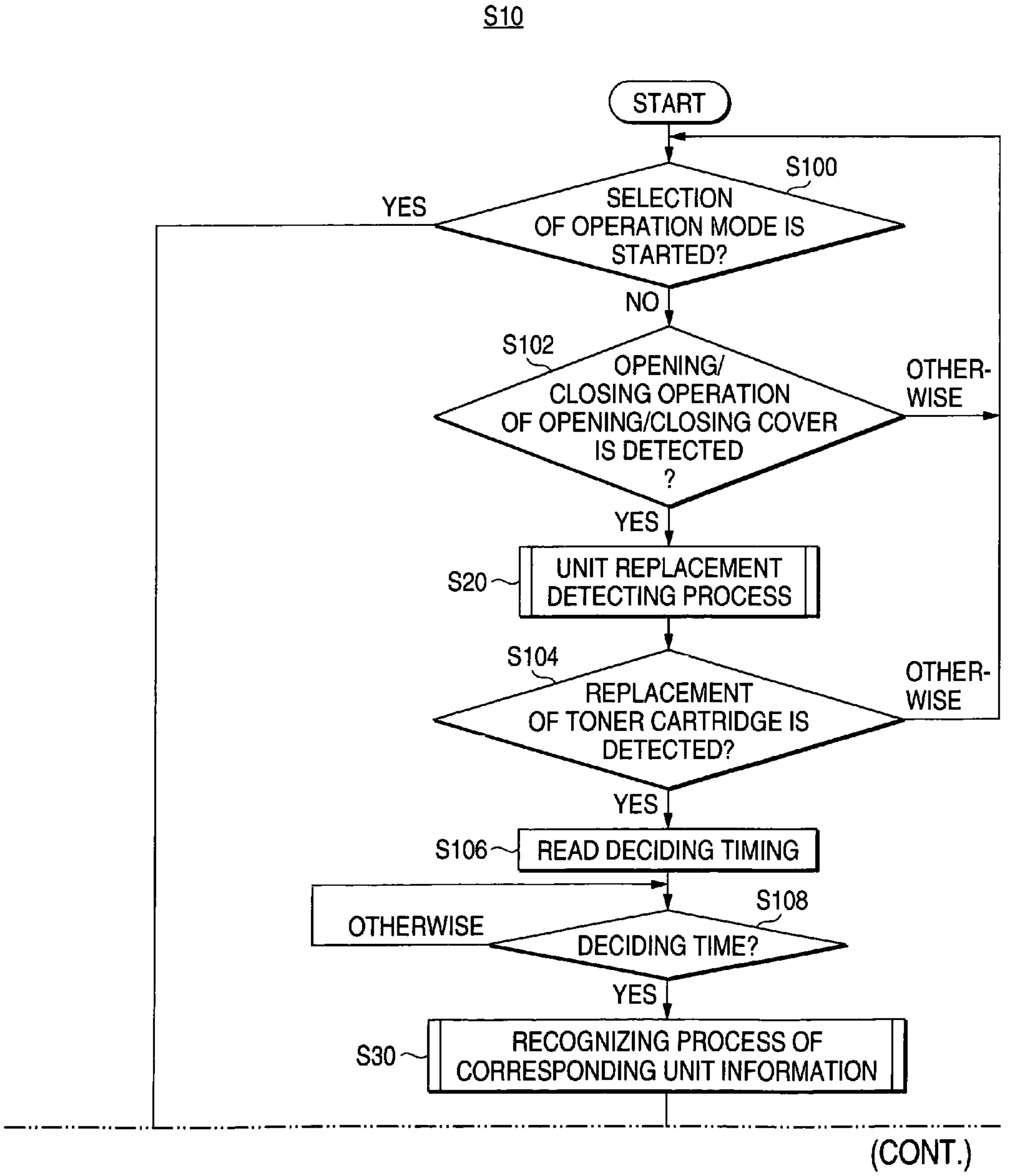
FIG. 17 is a flow chart (S10) showing processes in which the image forming apparatus prepares for a printing operation adapted to an operation mode for the toner cartridge.

FIG. 17 is a flow chart (S10) showing processes in which the image forming apparatus 10 prepares for a printing operation corresponding to an operation mode for the toner cartridge 52.

Figure 18:
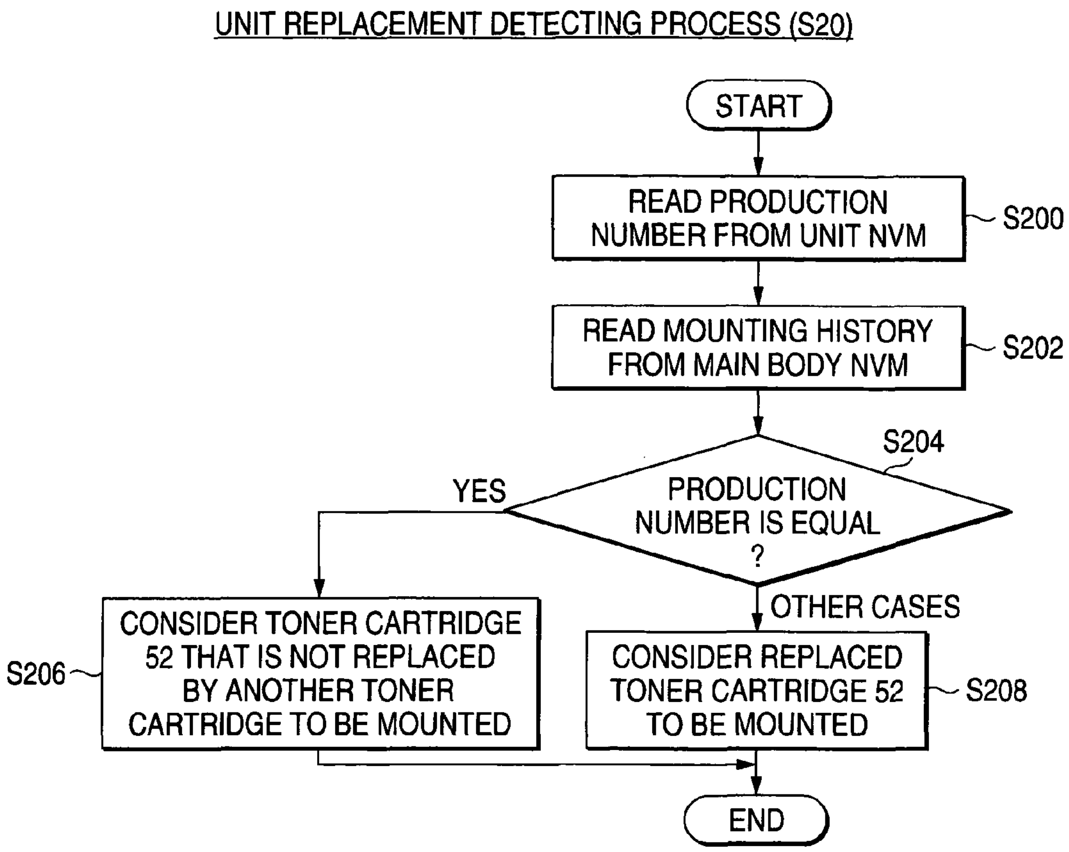
FIG. 18 is a flow chart (S20) showing unit replacement detecting processes for detecting whether or not the toner cartridge is replaced by another toner cartridge.

FIG. 18 is a flowchart (S20) showing unit replacement detecting processes for detecting whether or not the toner cartridge 52 is replaced by another toner cartridge.

Figure 19:
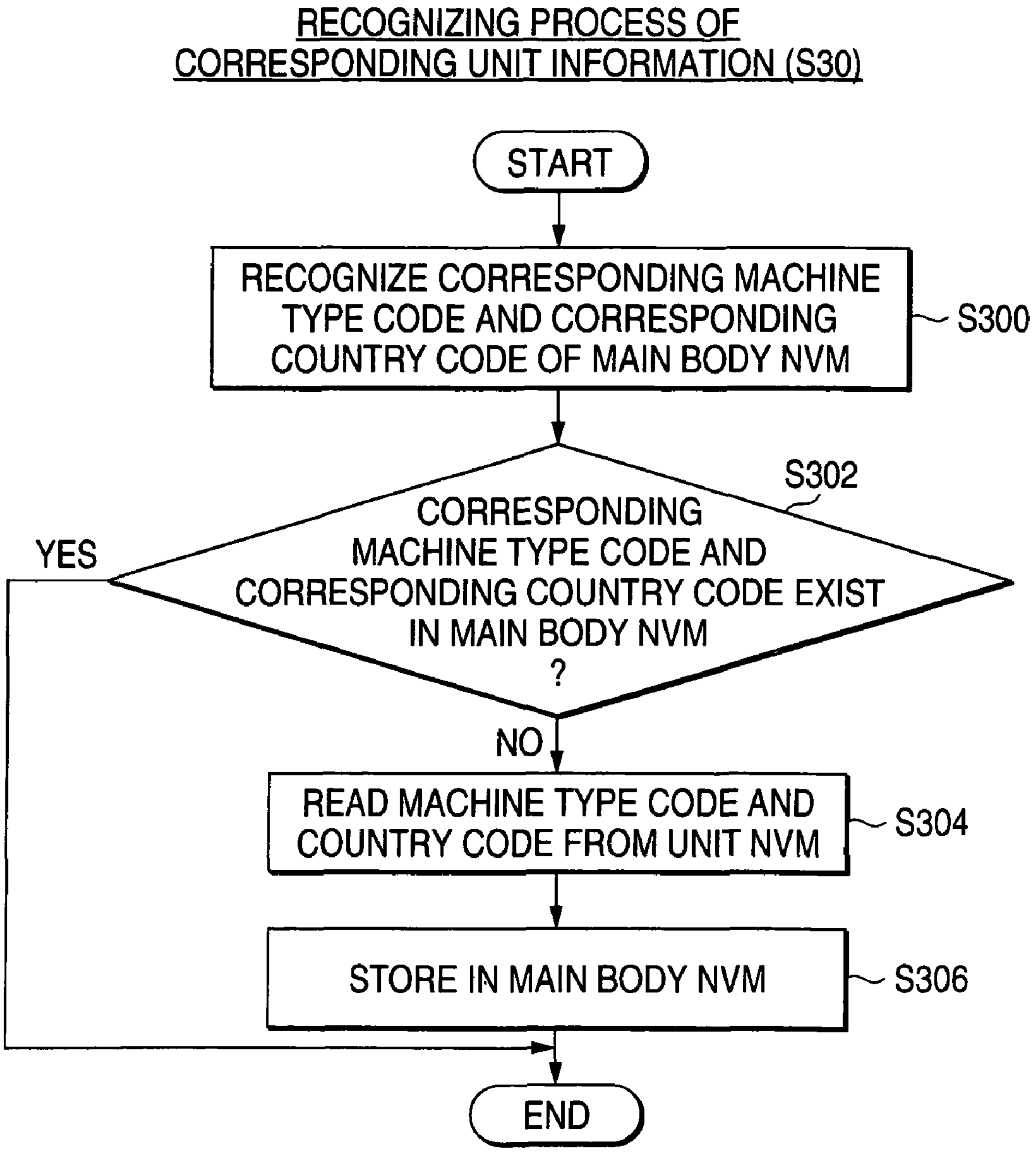
FIG. 19 is a flow chart (S30) showing recognizing processes for recognizing whether or not corresponding unit information exists in the main body NVM.

FIG. 19 is a flow chart (S30) showing recognizing processes for recognizing whether or not corresponding unit information exists in the main body NVM 228.

Figure 20:
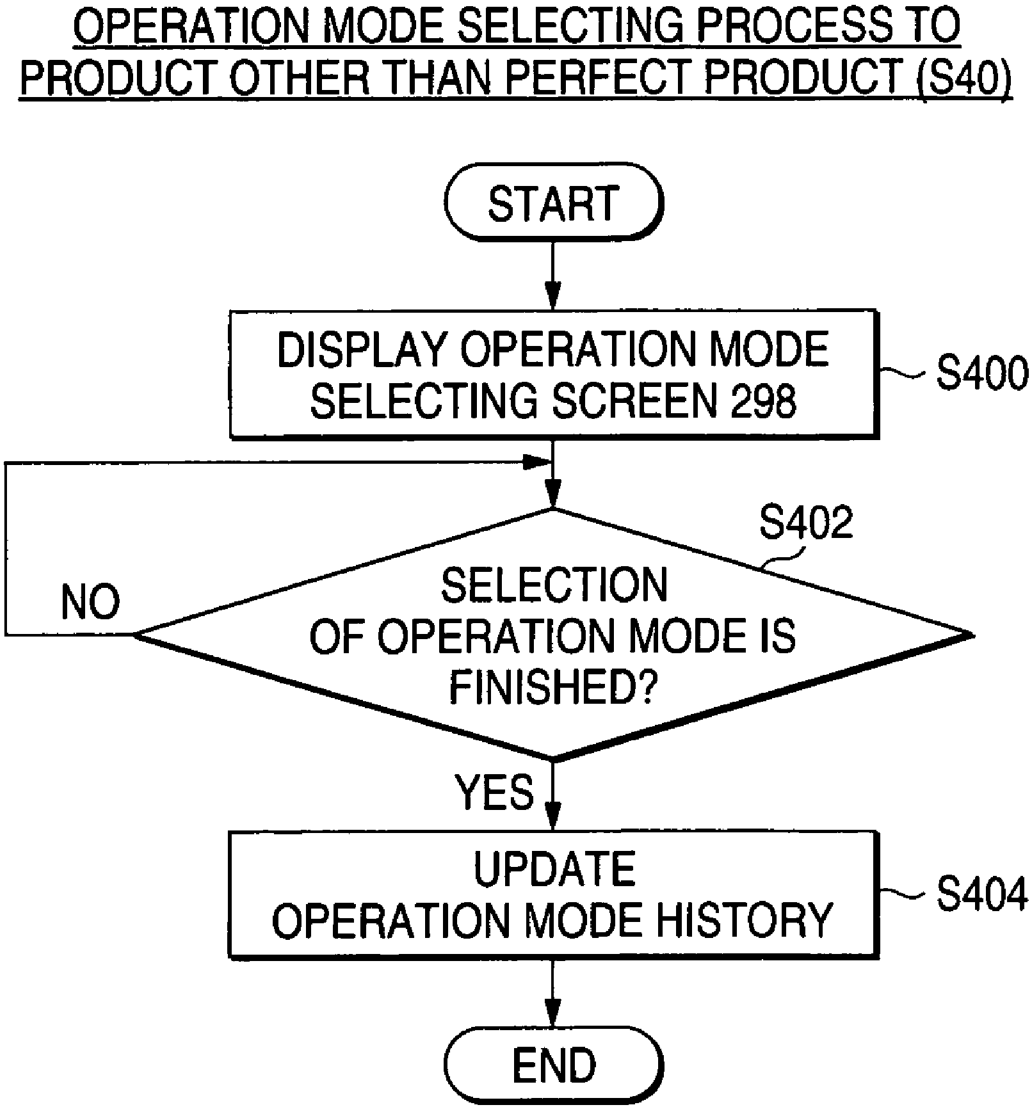
FIG. 20 is a flow chart (S40) showing operation mode selecting processes carried out by the image forming apparatus to a product other than a perfect product in order to select an operation mode to the product other than the perfect product by a user.

FIG. 20 is a flow chart (S40) showing operation mode selecting processes carried out by the image forming apparatus 10 to the product other than the perfect product in order to select an operation mode to the product other than the perfect product by a user.

Figure 21:
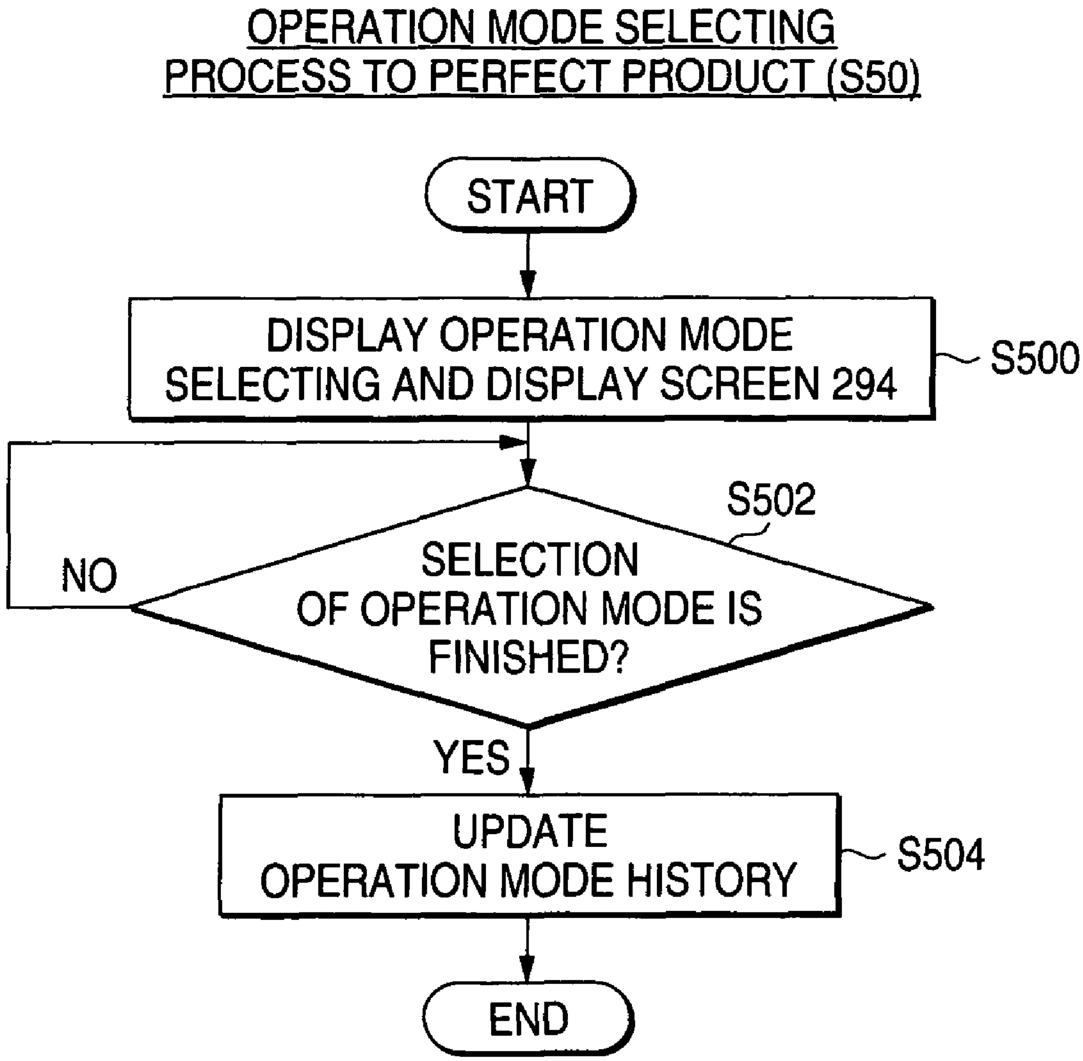
FIG. 21 is a flow chart (S50) showing operation mode selecting processes carried out by the image forming apparatus to the perfect product in order to select an operation mode to the perfect product by a user.

FIG. 21 is a flow chart (S50) showing operation mode selecting processes carried out by the image forming apparatus 10 to the perfect product in order to select an operation mode to the perfect product by a user.

As shown in FIG. 17, in step 100 (S100), the CPU 202 decides whether or not there is an input for starting to select the operation mode by operating the UI device 18 from the user. When there is the input for starting to select the operation mode, the CPU 202 advances to the processes of S40. When there is no input for starting to select the operation mode, the CPU 202 advances to a process of S102.

In the step 102 (S102), the CPU 202 decides whether or not the opening and closing detecting sensor 19 detects the opening and closing operations of the opening and closing cover 16. When the CPU 202 decides that the opening and closing operations of the opening and closing cover 16 are detected, the CPU 202 advances to processes of S20. Otherwise, the CPU 202 advances to the process of S100. That is, when the opening and closing cover 16 is opened and closed, there is a possibility that the toner cartridge 52 is replaced by another toner cartridge. Thus, a unit replacement detecting process is carried out.

In step 200 (S200: FIG. 18), the CPU 202 reads the production number 280 from the unit NVM 184.

In step 202 (S202), the CPU 202 reads the production number of a lastly mounted toner cartridge included in the mounting history 262 of each unit of the main body NVM 228.

In step 204 (S204), the CPU 202 decides whether or not the production number of the lastly mounted toner cartridge is the same as the production number 280 read from the unit NVM 184. When the production number of the lastly mounted toner cartridge is the same as the production number 280 read from the unit NVM 184, the procedure advances to a process of S206. Other wise, the CPU 202 advances to a process of S208.

In the step 206 (S206), the CPU 202 considers the toner cartridge 52 that is not replaced by another toner cartridge to be mounted again (not replaced).

In the step 208 (S208), the CPU 202 considers the replaced toner cartridge 52 to be mounted (a replacement is detected).

Instep 104 (S104: FIG. 17), when the CPU 202 considers that the replacement or exchange of the toner cartridge 52 is detected, the CPU 202 advances to a process of S106. Otherwise, the CPU 202 advances to the process of S100.

In the step 106 (S106), the CPU 202 reads the deciding time setting value 252 from the program ROM 224.

The value of the deciding time setting value 252 may be 0.

In step 108 (S108), the CPU 202 decides whether or not it is a deciding time for starting to decide whether the mounted toner cartridge 52 is a perfect product or a product other than the perfect product by a timer that is not illustrated. When it is the deciding time for starting to decide the toner cartridge is the perfect product or the product other than the perfect product, the procedure advances to processes of S30. Otherwise, the CPU 202 waits for the deciding time.

In step 300 (S300: FIG. 19), the CPU 202 recognizes whether or not the corresponding machine type code 258 and the corresponding country code 260 are stored in the main body NVM 228 as shown in, for instance, FIG. 22A.

In step 302 (S302), when the corresponding machine type code 258 and the corresponding country code 260 are stored in the main body NVM 228, the CPU 202 advances to a process of S110. When the corresponding machine type code and the corresponding country code are not stored in the main body NVM 228, the CPU 202 advances to a process of S304.

In the step 304 (S304), the CPU 202 reads the machine type code 276 and the country code 278 stored in the unit NVM 184 as shown in, for instance, FIG. 22B, from the unit NVM 184.

In step 306 (306), the CPU 202 stores the machine type code 276 and the country code 278 read from the unit NVM 184 in the corresponding machine type code 258 and the corresponding country code 260 of the corresponding unit information area 254.

In the step 110 (S110), the CPU 202 decides whether or not the corresponding machine type code 258 and the corresponding country code 260 are stored in the main body NVM 228 in the process of S302. The corresponding machine type code 258 and the corresponding country code 260 are stored in the main body NVM 228, the CPU 202 advances to a process of S112. When the corresponding machine type code 258 and the corresponding country code 260 are not stored in the main body NVM 228 and read from the unit NVM 184, the CPU 202 advances to a process of S118.

In the step 112 (S112), the CPU 202 reads the corresponding machine type code 258 and the corresponding country code 260 from the main body NVM 228.

In step 114 (S114), the CPU 202 collates the machine type code 276 shown in FIG. 22B with the corresponding machine type code 258 shown in FIG. 22A. The CPU collates the country code 278 with the corresponding country code 260 in the same manner. When the replaced or exchanged toner cartridge 52 is decided to be the perfect product, the CPU 202 advances to processes of S50. On the other hand, when the machine type code 276 and the country code 278 read from the unit NVM 184 are values shown in FIG. 22C and the machine type code 276 does not correspond to the corresponding machine type code 258 so that the replaced toner cartridge 52 is decided to be the product other than the perfect product, the COPU 202 advances to S116.

In the step 116 (S116), the CPU 202 updates the mounting history of the toner cartridge 52 included in the mounting history of each unit 226 of the main body NVM 228 in accordance with data read from the currently mounted toner cartridge 52 to advance to processes of S40.

Figure 23A:
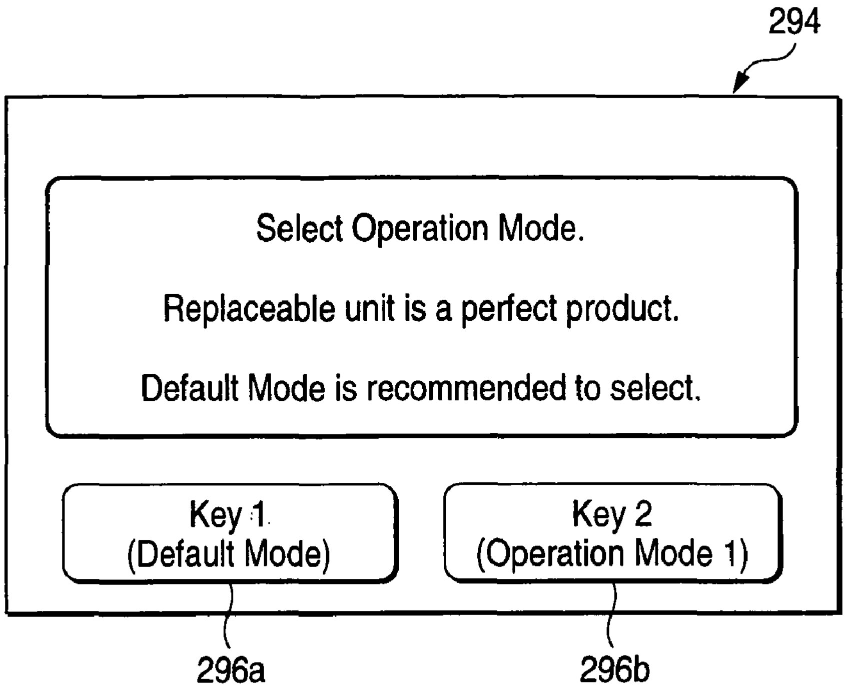
FIGS. 23A and 23B are diagrams showing screens displayed on a UI device.
Figure 23B:
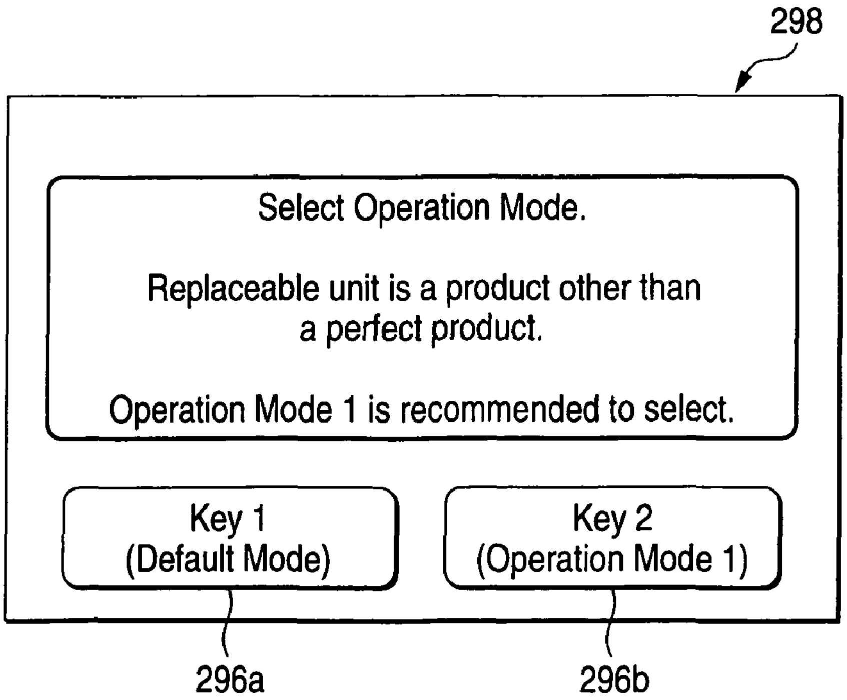

In step 400 (S400: FIG. 20), the UI device 18 displays an operation mode selecting screen 298 shown in FIG. 23B.

In step 402 (S402), the CPU 202 decides whether or not an input is finished for selecting either a key button 296*a* for selecting a default mode (an operation mode corresponding to the perfect product) displayed on the operation mode selecting screen 298 or a key button 296*b* for designating other operation mode. When the input for selecting either the key button 296*a* or 296*b* is finished, the CPU 202 advances to a process of S404. When there is not the input for designating either of the operation modes, the image forming apparatus 10 waits for a selection of the operation mode by a user.

In the step 404 (S404), the CPU 202 updates (including overwrite) each operation mode history 270 of the main body NVM 228 to the operation mode selected in S402.

In step 500 (S500: FIG. 21), the UI device 18 displays an operation mode selecting screen 294 shown in FIG. 23A.

In step 502 (S502), the CPU 202 decides whether or not an input is finished for selecting either a key button 296*a* for selecting a default mode (an operation mode corresponding to the perfect product) displayed on the operation mode selecting screen 294 or a key button 296*b* for designating other operation mode. When the input for selecting either the key button 296*a* or 296*b* is finished, the CPU 202 advances to a process of S504. When there is not the input for designating either of the operation modes, the image forming apparatus 10 waits for a selection of the operation mode by a user.

In the step 504 (S504), the CPU 202 updates (including overwrite) each operation mode history 270 of the main body NVM 228 to the operation mode selected in S502.

In step 118 (S118: FIG. 17), the CPU 202 prepares for a printing operation suitable for the selected operation mode included to each latest operation mode history 270 to finish the processes. In the preparation for a printing operation in S118, for instance, whether the mounted toner cartridge 52 is the perfect product or the product other than the perfect product may be displayed on the UI device 18.

When it is decided whether the toner cartridge is the perfect product or the product other than the perfect product, data to be collated does not need to be limited to the country code and the machine type code. For instance, as shown in FIG. 22D, the maker ID 310 may be added to the data further read from the unit NVM 184 to be collated. As shown in FIG. 22E, the production number 280 may be added to the data further read and collated. In this case, whether the toner cartridge is the perfect product or the product other than the perfect product can be decided depending on whether or not a specific part of the production number 280 corresponds to a specific part of the corresponding production number 300 stored in the main body NVM 228.

In such a way, even when corresponding unit information is not previously stored in the main body NVM 228 of the image forming apparatus 10, if unit information is stored in the unit NVM 184 of the replaceable unit, the corresponding unit information can be written in the main body NVM 228 of the image forming apparatus 10. Accordingly, the unit information having a country or an area adapted only to the unit NVM 184 of the replaceable unit is written, so that the corresponding unit information may not need to be previously written in the main body NVM 228 of the image forming apparatus 10.

A plurality of other operation modes different from the operation mode corresponding to the perfect product may be provided and the user may freely select the operation mode from the plurality of other operation modes.

In such a way, even when the replaceable unit of the image forming apparatus 10 is the product other than the perfect product, the user can select the operation mode different from the operation mode corresponding to the perfect product to improve the quality of an image.

Further, when all the replaceable units are the perfect products, the operation modes that can be selected by the user may be limited so that the image forming apparatus 10 operates only under the operation mode corresponding to the perfect product. Thus, the user may be prevented from erroneously deteriorating the image quality.

Now, a modified example of the image forming apparatus according to this embodiment of the present invention will be described below. The modified example of the image forming apparatus receives from the host device 2 information related to countries or areas set to the operating system (OS) of the host device 2.

Figure 24:
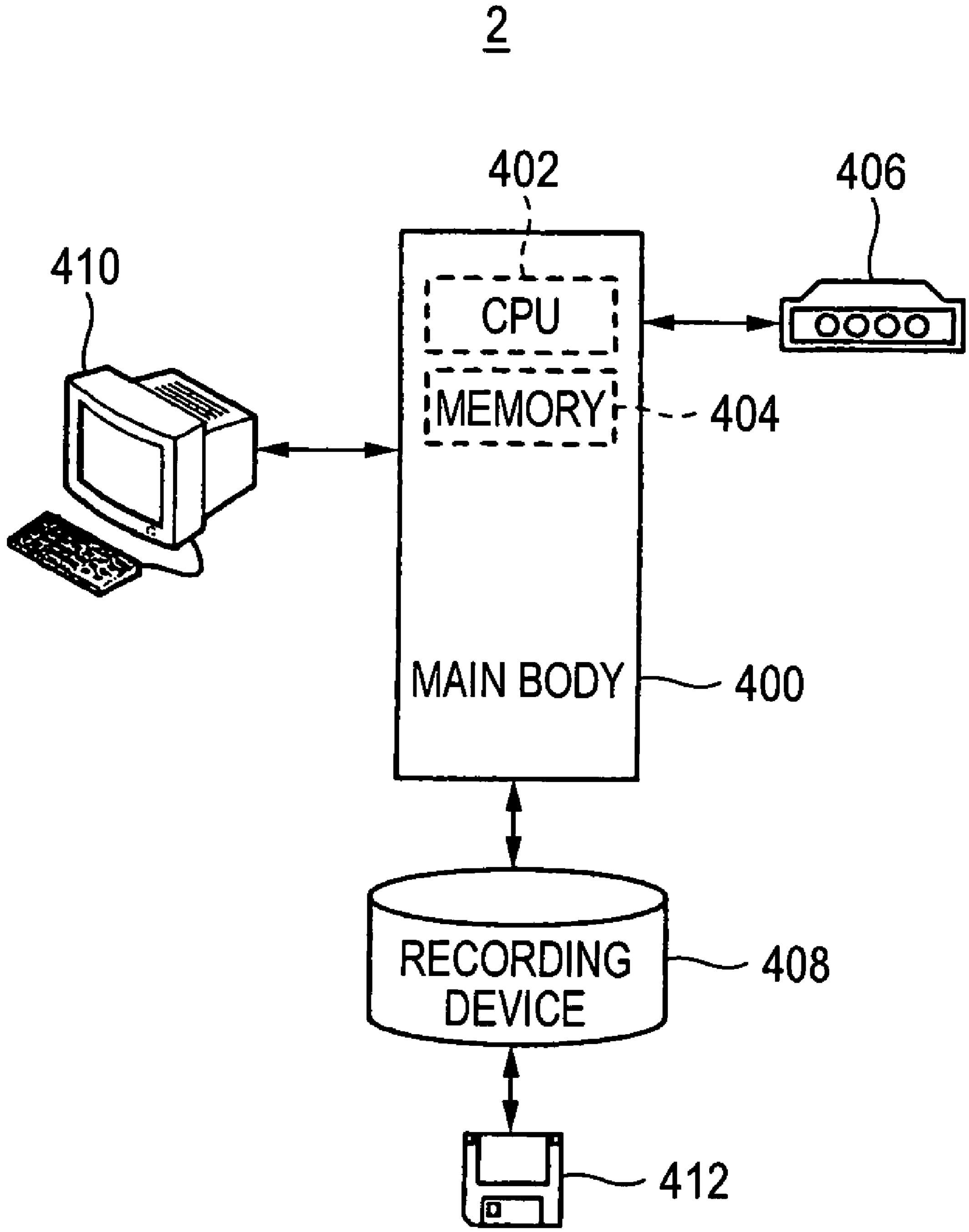
FIG. 24 is a diagram showing the hardware structure of a host device.

FIG. 24 is a diagram showing the structure of hardware of the host device 2 shown in FIG. 1.

As shown in FIG. 24, the host device 2 includes a main body 400 including a CPU 402 and a memory 404, a display/input device 410 having a liquid crystal display/keyboard and mouse (not shown), a recording device 408 such as an HDD/CD device and a communication device 406 for performing a communication with a network. That is, the host device 2 includes component parts as an ordinary computer capable of performing a communication through the network. On the host device 2, the OS (not shown) operates. The OS controls information related to language and time (deviation from a standard time) and countries or areas displayed on the display/input device 410 of the host device 2.

Figure 25:
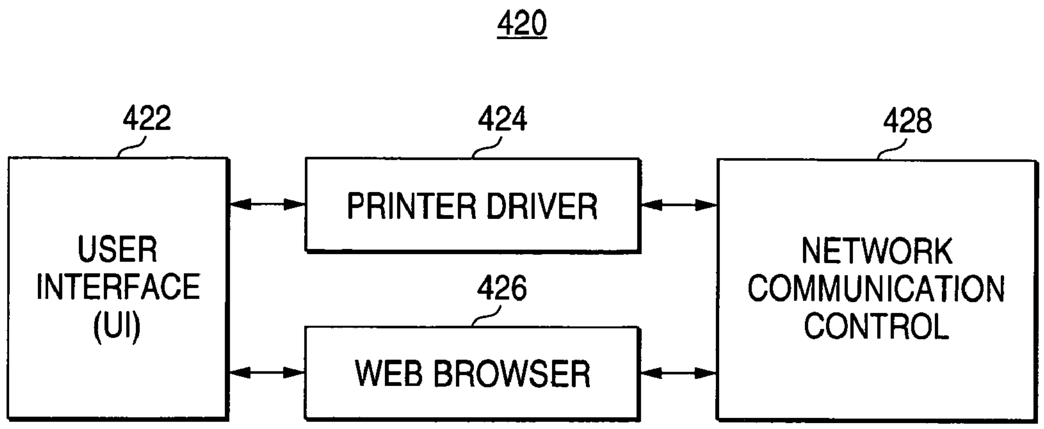
FIG. 25 is a diagram showing the structure of a client program operating on the host device.

FIG. 25 is a diagram showing the structure of a client program 420 operating on the host device 2 shown in FIG. 1.

As shown in FIG. 25, the client program 420 includes a user interface (UI part) 422, a printer driver 424, a web browser 426 and a network communication control part 428.

The client program 420 is supplied to the recording device 408 of the host device 2 through, for instance, a recording medium 412, loaded in the memory 404 and executed. The client program 420 provides a state inspecting function and a setting changing function of the image forming apparatus 10 to a user using the host device 2 by these components. Further, the client program 420 obtains the information set to the OS of the host device 2 and outputs the information to the image forming apparatus 10.

In the client program 420, the UI part 422 receives the operation of the user to the display/input device 410 to control the processes of component parts of the client program 420. The UI part 422 displays data received by the printer driver 525 or the web browser 426 through the network 3 to the user.

The printer driver 424 provides the state inspecting function and the setting changing function of the image forming apparatus 10 to the user of the host device 2. Further, the printer driver 424 has a setting and transmitting function for obtaining the information set to the OS of the host device 2 and transmitting the information to the image forming apparatus 10. The client program 420 may include a utility program having the same functions as those of the printer driver 424. The utility program is not specifically limited to a specific image forming apparatus and has the state inspecting function, the setting changing function and the setting and transmitting function of the apparatus connected to the network.

The web browser 426 provides the state inspecting function and the setting changing function of the image forming apparatus 10 to the user of the host device 2 through a web server operating on the image forming apparatus 10. Further, the web browser 426 has a setting and transmitting function to the image forming apparatus 10 from the host device 2.

The client program 420 includes software (installer) for installing the printer driver 424 and the web browser 426.

The network communication control part 428 controls a communication with the image forming apparatus 10 connected to the network communication control part 428 through the network 3 shown in FIG. 1.

Figure 26:
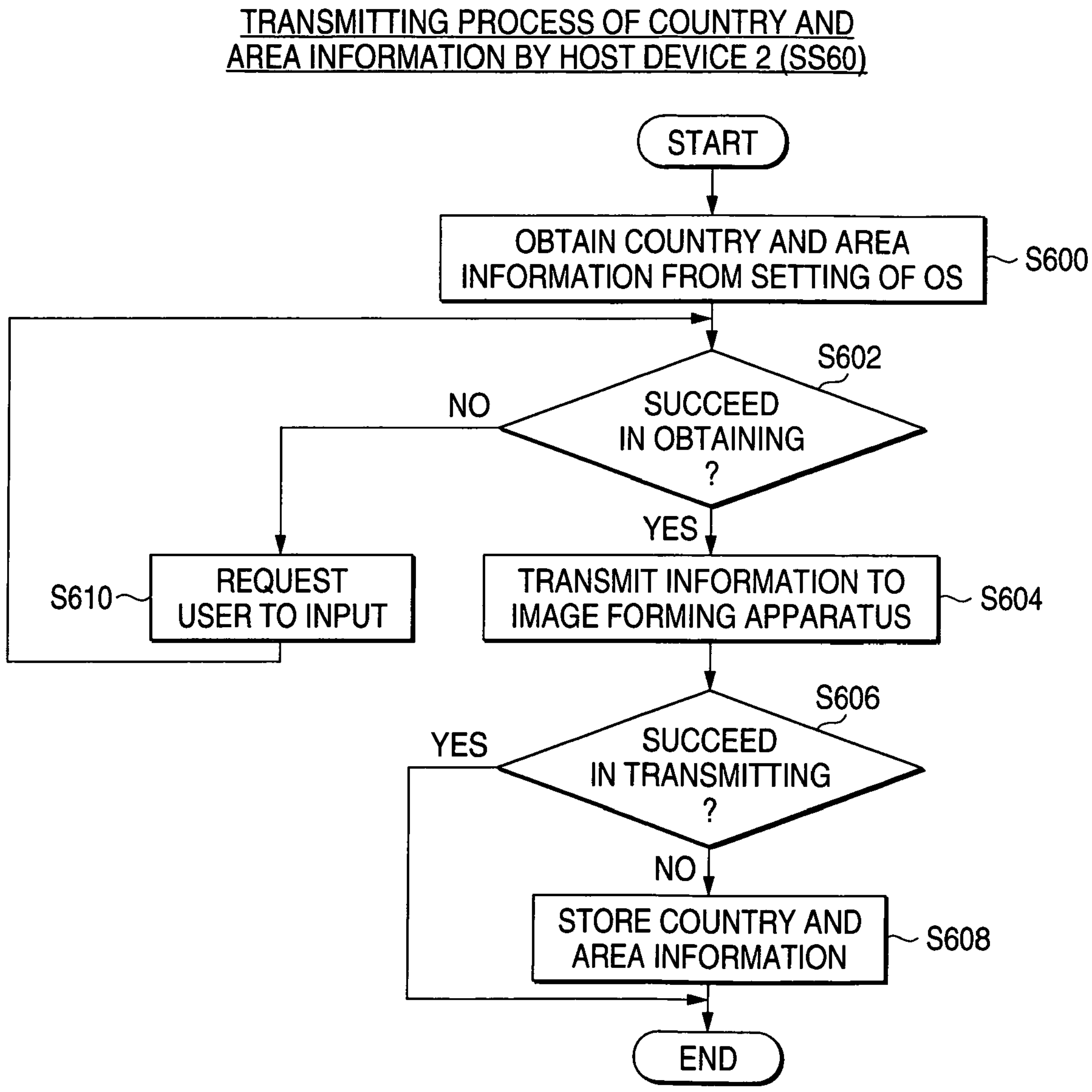
FIG. 26 is a flow chart (S60) showing processes in which the client program transmits country and area information set to the host device.

Now, a control method that the client program 420 transmits information related to the host device 2 to the image forming apparatus 10 will be described below. FIG. 26 is a flow chart (S60) showing processes that the client program 420 transmits country and area information set to the host device 2.

Figure 27:
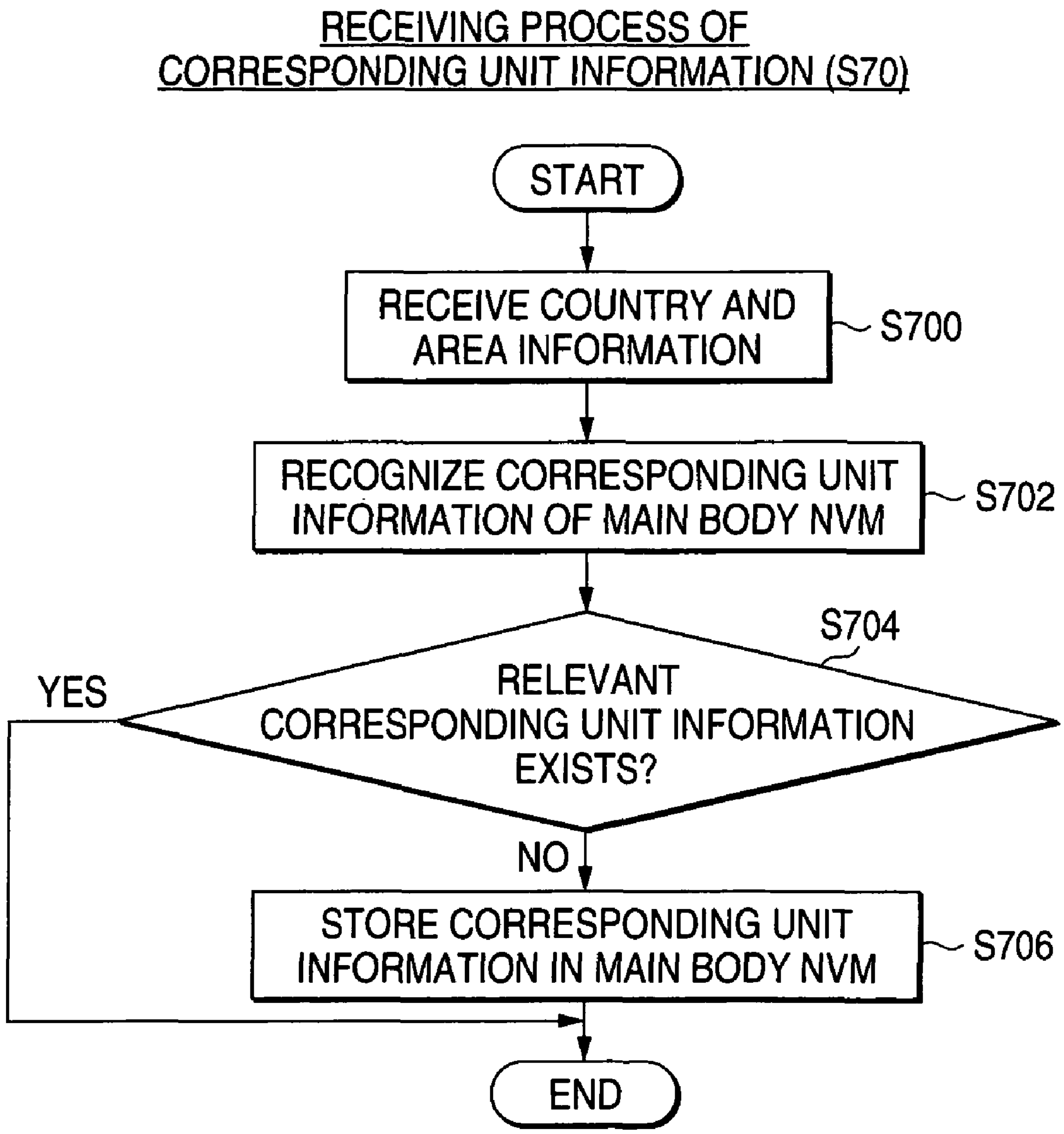
FIG. 27 is a flow chart (S70) showing receiving processes in which the image forming apparatus according to the embodiment of the present invention receives the country and area information transmitted from the host device as corresponding unit information.

FIG. 27 is a flow chart (S70) showing receiving processes that the image forming apparatus 10 receives the county and area information transmitted from the host device 2 as the corresponding unit information.

Figure 28:
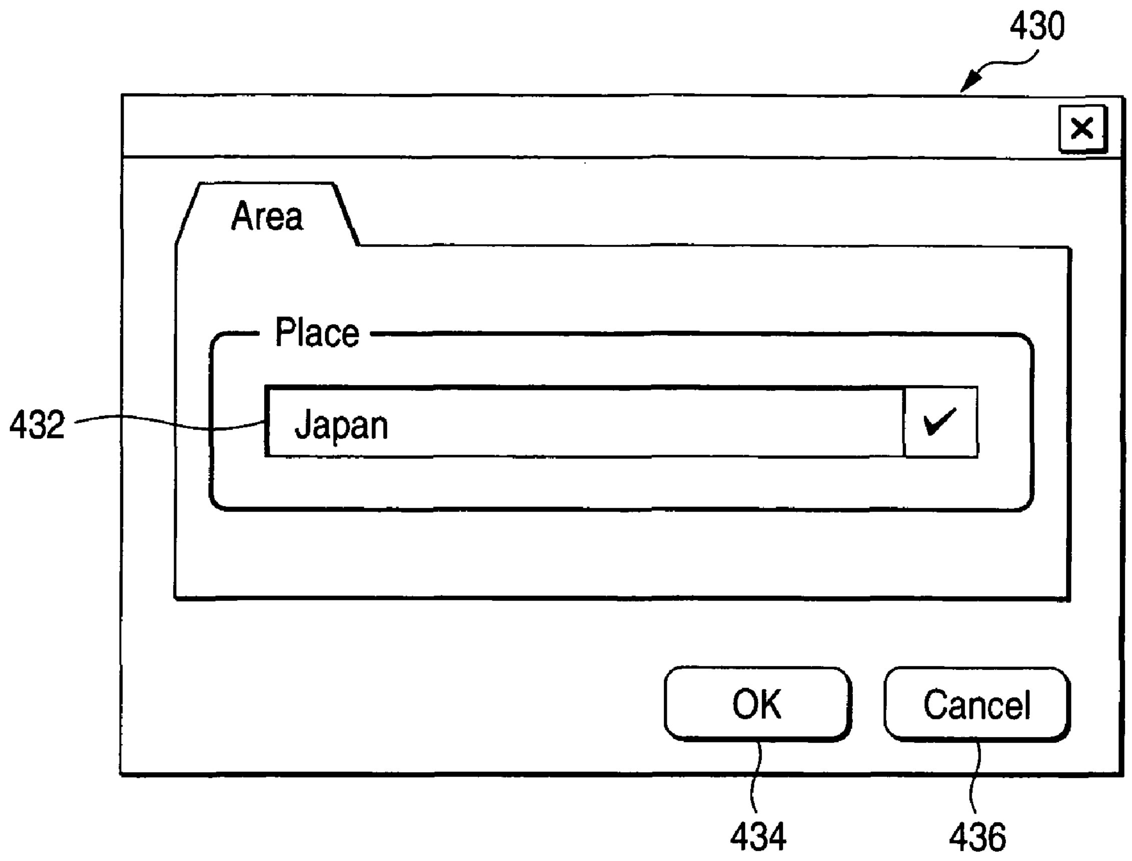
FIG. 28 is a diagram showing the country and area information set to the host device.

As shown in FIG. 26, in step 600 (S600), when the printer driver 424 is installed in the host device 2, the client program 420 obtains the country and area information set to the OS of the host device 2. Specifically, as shown in FIG. 28, the client program 420 obtains the country and area information that can be set to the host device 2 from an area setting screen 430 including a country and area input part 432 for inputting the country and area information from, for instance, a drop-down menu, an OK button 434 for determining the input, a cancel button 436 for canceling the input.

In step 602 (S602), the client program 420 decides whether or not the country and area information set to the host device 2 can be obtained. When the client program 420 can obtain the country and area information, the client program advances to a process of S604. When the client program 420 can not obtain the country and area information, the client program advances to a process of S610.

In the step 610 (S610), the client program 420 requests the user of the host device 2 to input the country and area information by using the display/input device 410. When the user completely inputs the country and area information, the client program 420 advances to the process of S602.

In the step 604 (S604), the client program 420 transmits the obtained country and area information to the image forming apparatus 10 through the network 3.

In step 606 (S606), the client program 420 decides whether or not the country and area information can be transmitted to the image forming apparatus 10. When the client program 420 can transmit the country and area information to the image forming apparatus 10, the client program 420 finishes transmitting processes (S60). When the client program 420 cannot transmit the country and area information to the image forming apparatus 10, the client program 420 advances to a process of S608.

In the step 608 (S608), the client program 420 stores and manages the obtained country and area information in the recording device 408 of the host device 2. The country and area information that cannot be transmitted and is stored in the host device 2 may be transmitted again when a network connection is established between the host device 2 and the image forming apparatus 10, or when the host device 2 outputs a print request to the image forming apparatus 10.

When the host device 2 transmits the country and area information to the image forming apparatus 10, in step 700 (S700), the CPU 202 of the image forming apparatus 10 receives the country and area information transmitted from the host device 2 through the network 3 as shown in FIG. 27.

In step 702 (S702), the CPU 202 recognizes whether or not the corresponding country code 260 and the area code 306 are stored in the main body NVM 228.

In step 704 (S704), when the corresponding country code 260 and the area code 306 are stored in the main body NVM 228, the CPU 202 finishes processes of S70. When the corresponding country code 260 and the area code 306 are not stored in the main body NVM 228, the CPU 202 advances to a process of S706.

In the step 706 (S706), the CPU 202 stores the country and area information transmitted from the host device 2 in the country code 260 and the area code 306 of the corresponding unit information area 254.

As described above, even when the information related to the country or the area is not previously stored in the main body NVM 228 of the image forming apparatus 10, the image forming apparatus 10 can receive the information set to the host device 2. Accordingly, even when the image forming apparatus 10 is installed in any country, the image forming apparatus 10 can provide a function suitable for the country or the area in which the image forming apparatus 10 is installed.

The host device 2 transmits setting information to the image forming apparatus 10 through the network 3, however, the network 3 may be a USB connection or a serial connection.

Now, a second modified example of the image forming apparatus according to the embodiment of the present invention will be described below. The second modified example of the image forming apparatus receives language information transmitted when the user accesses the image forming apparatus 10 by using a web browser 426 operating on the host device 2.

The second modified example of the image forming apparatus further includes a web server (refer it also to as a WWW server or a http server) communicating with the host device 2 by a http (HyperText Transfer Protocol) in the executing program 238 stored in the program area 234 to communicate with the hose device 2 by using TCP/IP as a protocol. Further, the image forming apparatus 10 and the host device 2 are included in, for instance, the same sub-net. To the image forming apparatus 10, 192. 168. 0. 1 is allocated as an IP address. To the host device 2, 192. 168. 0. 2 is allocated as an IP address.

Figure 29:
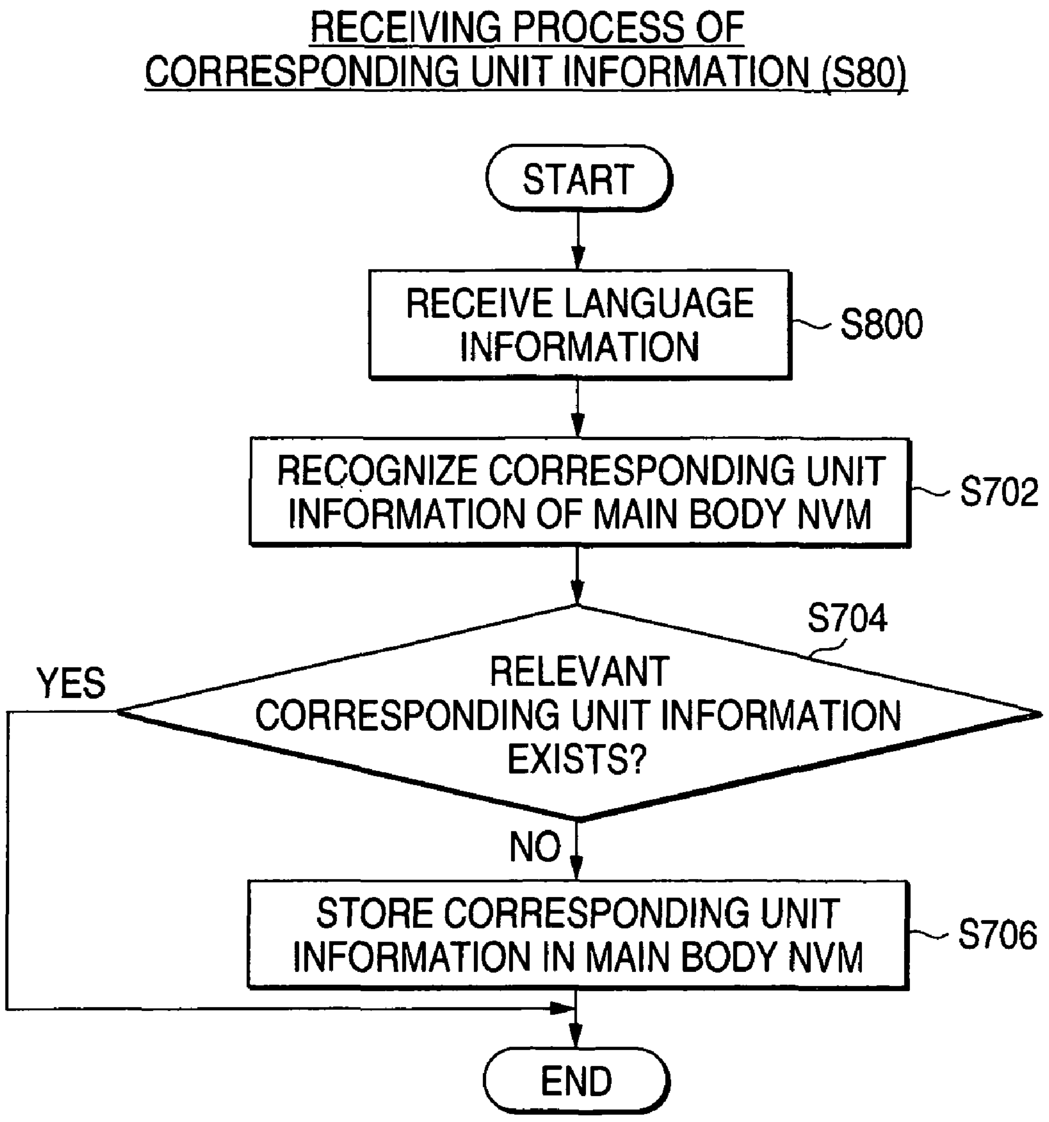
FIG. 29 is a flow chart (S80) showing receiving processes in which the image forming apparatus according to the embodiment of the present invention receives language information transmitted from the host device 2 as corresponding unit information.

FIG. 29 is a flow chart (S80) showing a receiving process for receiving the language information transmitted from the host device 2 as corresponding unit information. In processes of S80 shown in FIG. 29, the processes substantially the same as those of S70 shown in FIG. 27 are designated by the same reference numerals.

Figure 30:
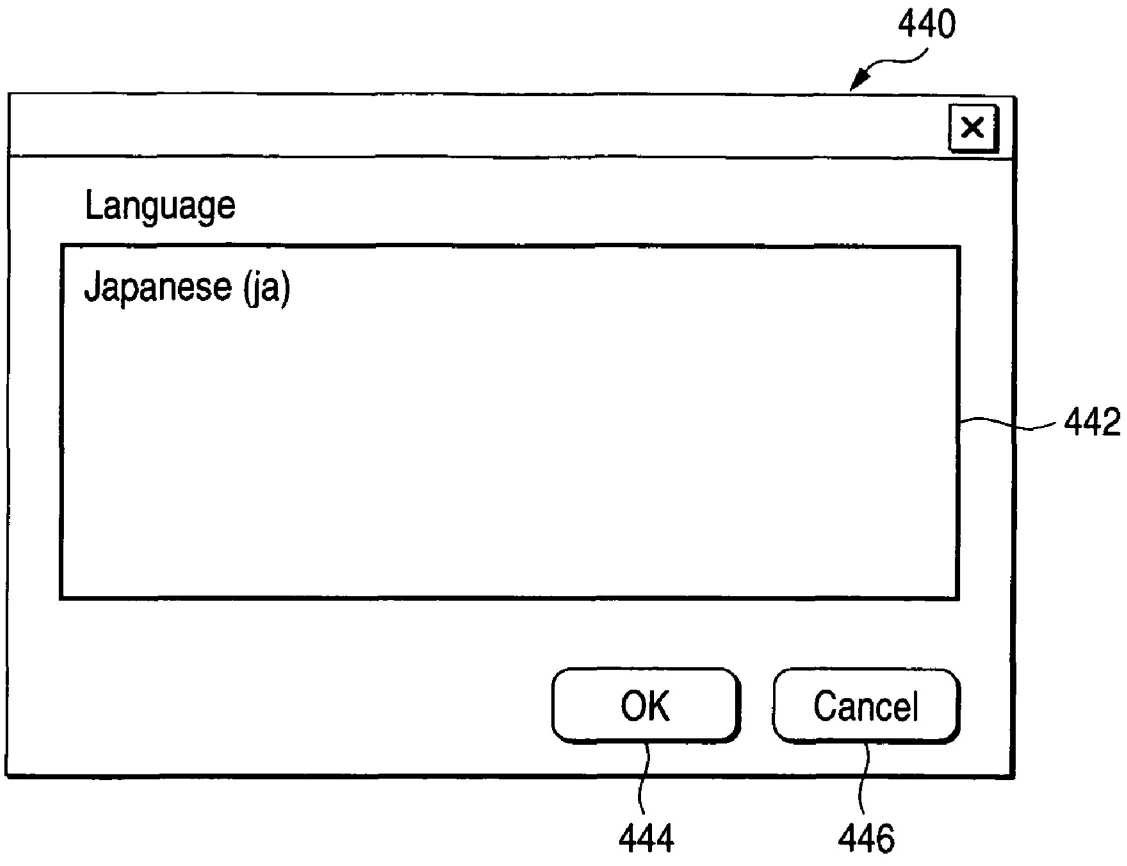
FIG. 30 is a diagram showing the language information set to a web browser operating on the host device.

When the user accesses the image forming apparatus 10 through the web server operating on the image forming apparatus 10 by the web browser 426 operating on the host device 2, for instance, to set the image forming apparatus 10, the image forming apparatus 10 receives language information (Accept-Language) added by the http in step 800 as shown in FIG. 29. Specifically, as shown in FIG. 30, the language information is information set on the host device 2 from a language setting screen 440 including a language information input part 442 for inputting the language information, an OK button for determining an input and a cancel button 446 for canceling the input. Further, the language information is information by which countries or areas where the host device 2 is used can be specified. Accordingly, the image forming apparatus 10 can specify the countries or areas in which the host device 2 is installed from the received language information.

As described above, even when information related to the countries or areas is not previously stored in the main body NVM 228 of the image forming apparatus 10, the user accesses the image forming apparatus 10 by using the web browser 426 so that the image forming apparatus 10 can receive the language information set to the host device 2. Since the image forming apparatus 10 can specify the countries or areas in accordance with the received language information, even when the image forming apparatus is installed in any area, the image forming apparatus can provide a function suitable for the countries or areas in which the apparatus is installed.

What is claimed is:

1. An image forming apparatus comprising:

an apparatus main body;

at least one first replaceable unit mounted on the apparatus main body so as to be replaced by another unit;

a first information storing unit provided in the first replaceable unit and having specific information written;

a second information storing unit provided in the apparatus main body in which specific information can be written;

a receiving unit that receives the specific information from the first replaceable unit;

a writing unit that writes the specific information received by the receiving unit to the second information storing unit;

a comparing unit that compares the specific information written in the second information storing unit by the writing unit with information obtained from a second replaceable unit to replace the first replaceable unit; and a deciding unit that decides whether the second replaceable unit is a perfect product or a product other than the perfect product in accordance with the compared result of the comparing unit, wherein the second replaceable unit has toner with an electrifying capacity, the electrifying capacity being modified based on a decision of whether the second replaceable unit is the perfect product or the product other than the perfect product.

2. The image forming apparatus according to claim 1, wherein the specific information written in the first information storing unit includes any one or more of a machine type code, a country code, a maker ID or a production number.

3. The image forming apparatus according to claim 1, wherein the deciding unit is configured to decide whether the second replaceable unit is the perfect product or a product other than the perfect product based on specific information written in the second information storing unit being specific information corresponding to the perfect product.

4. The image forming apparatus according to claim 1, wherein when the first replaceable unit is mounted on the apparatus main body and the specific information written in the first information storing unit has not been written on the second information storing unit, the writing unit is configured to write the specific information in the first information storing unit to the second information storing unit.

5. An image forming apparatus comprising:

an apparatus main body;

an information storing unit provided in the apparatus main body in which specific information can be written;

a receiving unit that receives the specific information from a first replaceable unit which is to be mounted on the apparatus main body;

a writing unit that writes the specific information received by the receiving unit to the information storing unit;

a comparing unit that compares the specific information written in the information storing unit by the writing unit with information obtained from a second replaceable unit to replace the first replaceable unit; and a deciding unit that decides whether the second replaceable unit is a perfect product or a product other than the perfect product in accordance with the compared result of the comparing unit, wherein the second replaceable unit has toner with an electrifying capacity, the electrifying capacity being modified based on a decision of whether the second replaceable unit is the perfect product or the product other than the perfect product.

* * * * *